US009449532B2

(12) United States Patent
Black et al.

(10) Patent No.: US 9,449,532 B2
(45) Date of Patent: Sep. 20, 2016

(54) HERNIA MODEL

(71) Applicant: Applied Medical Resources Corporation, Rancho Santa Margarita, CA (US)

(72) Inventors: Katie Black, Rancho Santa Margarita, CA (US); Tracy Breslin, Rancho Santa Margarita, CA (US); Nikolai Poulsen, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 180 days.

(21) Appl. No.: 14/278,929

(22) Filed: May 15, 2014

(65) Prior Publication Data
US 2014/0342334 A1 Nov. 20, 2014

Related U.S. Application Data

(60) Provisional application No. 61/823,834, filed on May 15, 2013, provisional application No. 61/973,999, filed on Apr. 2, 2014.

(51) Int. Cl.
G09B 23/34 (2006.01)
G09B 23/30 (2006.01)
G09B 23/28 (2006.01)

(52) U.S. Cl.
CPC ............. *G09B 23/30* (2013.01); *G09B 23/285* (2013.01); *G09B 23/34* (2013.01)

(58) Field of Classification Search
CPC ............................... G09B 23/30; G09B 23/34
USPC ........................................................ 434/269
See application file for complete search history.

(56) References Cited

U.S. PATENT DOCUMENTS 3,991,490 A  11/1976 Markman
4,001,951 A  1/1977 Fasse
(Continued)

FOREIGN PATENT DOCUMENTS

CN  2421706 Y  2/2001
CN  2751372 Y  1/2006
(Continued)

OTHER PUBLICATIONS

European Patent Office, International Search Report for International Application No. PCT/US2011/053859 A3, mailed on May 4, 2012, entitled "Portable Laparoscopic Trainer".
(Continued)

*Primary Examiner* — Sam Yao
*Assistant Examiner* — Peter J Alley
(74) *Attorney, Agent, or Firm* — Rimas T. Lukas

(57) ABSTRACT

A model for practicing transabdominal pre-peritoneal (TAPP) and total extraperitoneal (TEP) approaches for laparoscopic hernia repairs is provided. The model simulates an insufflated space between the abdominal muscles and peritoneum. A spring layer may be incorporated to provide a realistic resiliency to the model while in the simulated insufflated configuration. At least one hole is provided in the model from which synthetic tissue protrudes to simulate a hernia. The model is used to selectively simulate direct, indirect and femoral inguinal hernias as well as incisional hernias by removably placing the protruding simulated tissue into any one of several openings. The model contains all important anatomical structures and sits on a base frame or is connected to a rigid simulated pelvis. When located inside a laparoscopic trainer with an angled top cover, the model provides an ideal simulation for teaching and practicing laparoscopic hernia repair.

13 Claims, 11 Drawing Sheets

(56) References Cited

U.S. PATENT DOCUMENTS

| | | | |
|---|---|---|---|
| 4,332,569 | A | 6/1982 | Burbank |
| 4,371,345 | A | 2/1983 | Palmer et al. |
| 4,459,113 | A | 7/1984 | Boscaro Gatti et al. |
| 4,481,001 | A | 11/1984 | Graham et al. |
| 4,596,528 | A | 6/1986 | Lewis et al. |
| 4,726,772 | A | 2/1988 | Amplatz |
| 4,789,340 | A | 12/1988 | Zikria |
| 4,907,973 | A | 3/1990 | Hon |
| 5,061,187 | A | 10/1991 | Jerath |
| 5,104,328 | A | 4/1992 | Lounsbury |
| 5,149,270 | A | 9/1992 | McKeown |
| 5,180,308 | A | 1/1993 | Garito et al. |
| 5,230,630 | A | 7/1993 | Burgett |
| 5,273,435 | A | 12/1993 | Jacobson |
| 5,295,694 | A | 3/1994 | Levin |
| 5,320,537 | A | 6/1994 | Watson |
| 5,358,408 | A | 10/1994 | Medina |
| 5,368,487 | A | 11/1994 | Medina |
| 5,403,191 | A | 4/1995 | Tuason |
| 5,425,644 | A | 6/1995 | Szinicz |
| 5,425,731 | A | 6/1995 | Daniel et al. |
| 5,472,345 | A | 12/1995 | Eggert |
| 5,518,406 | A | 5/1996 | Waters |
| 5,518,407 | A | 5/1996 | Greenfield et al. |
| 5,620,326 | A | 4/1997 | Younker |
| 5,722,836 | A | 3/1998 | Younker |
| 5,727,948 | A | 3/1998 | Jordan |
| 5,769,640 | A | 6/1998 | Jacobus et al. |
| 5,775,916 | A | 7/1998 | Cooper et al. |
| 5,785,531 | A | 7/1998 | Leung |
| 5,800,178 | A | 9/1998 | Gillio |
| 5,803,746 | A | 9/1998 | Barrie et al. |
| 5,850,033 | A | 12/1998 | Mirzeabasov et al. |
| 5,873,732 | A | 2/1999 | Hasson |
| 5,873,863 | A | 2/1999 | Komlosi |
| 5,908,302 | A * | 6/1999 | Goldfarb ............ G09B 23/285 40/446 |
| 5,947,743 | A | 9/1999 | Hasson |
| 5,951,301 | A | 9/1999 | Younker |
| 6,083,008 | A | 7/2000 | Yamada et al. |
| 6,234,804 | B1 | 5/2001 | Yong |
| 6,336,812 | B1 | 1/2002 | Cooper et al. |
| 6,398,557 | B1 | 6/2002 | Hoballah |
| 6,474,993 | B1 | 11/2002 | Grund et al. |
| 6,485,308 | B1 | 11/2002 | Goldstein |
| 6,488,507 | B1 | 12/2002 | Stoloff et al. |
| 6,511,325 | B1 | 1/2003 | Lalka et al. |
| 6,517,354 | B1 | 2/2003 | Levy |
| 6,568,941 | B1 | 5/2003 | Goldstein |
| 6,654,000 | B2 | 11/2003 | Rosenberg |
| 6,659,776 | B1 | 12/2003 | Aumann et al. |
| 6,773,263 | B2 | 8/2004 | Nicholls et al. |
| 6,780,016 | B1 | 8/2004 | Toly |
| 6,857,878 | B1 | 2/2005 | Chosack et al. |
| 6,863,536 | B1 | 3/2005 | Fisher et al. |
| 6,866,514 | B2 | 3/2005 | Von Roeschlaub et al. |
| 6,887,082 | B2 | 5/2005 | Shun |
| 6,929,481 | B1 | 8/2005 | Alexander et al. |
| 6,939,138 | B2 | 9/2005 | Chosack et al. |
| 6,997,719 | B2 | 2/2006 | Wellman et al. |
| 7,008,232 | B2 | 3/2006 | Brassel |
| 7,056,123 | B2 | 6/2006 | Gregorio et al. |
| 7,080,984 | B1 | 7/2006 | Cohen |
| 7,255,565 | B2 | 8/2007 | Keegan |
| 7,272,766 | B2 | 9/2007 | Sakezles |
| 7,404,716 | B2 | 7/2008 | Gregorio et al. |
| 7,419,376 | B2 | 9/2008 | Sarvazyan et al. |
| 7,427,199 | B2 | 9/2008 | Sakezles |
| 7,465,168 | B2 | 12/2008 | Allen et al. |
| 7,467,075 | B2 | 12/2008 | Humphries et al. |
| 7,553,159 | B1 * | 6/2009 | Arnal .................... G09B 23/281 434/267 |
| 7,575,434 | B2 | 8/2009 | Palakodeti |
| 7,594,815 | B2 | 9/2009 | Toly |
| 7,648,367 | B1 | 1/2010 | Makower et al. |
| 7,677,897 | B2 | 3/2010 | Sakezles |
| 7,775,916 | B1 | 8/2010 | Mahoney |
| 7,780,451 | B2 | 8/2010 | Willobee et al. |
| 7,802,990 | B2 | 9/2010 | Korndorffer et al. |
| 7,806,696 | B2 | 10/2010 | Alexander et al. |
| 7,833,018 | B2 | 11/2010 | Alexander et al. |
| 7,837,473 | B2 | 11/2010 | Koh |
| 7,850,454 | B2 | 12/2010 | Toly |
| 7,857,626 | B2 | 12/2010 | Toly |
| 7,866,983 | B2 | 1/2011 | Hemphill et al. |
| 7,931,470 | B2 | 4/2011 | Alexander et al. |
| 7,931,471 | B2 | 4/2011 | Senagore et al. |
| 7,993,140 | B2 | 8/2011 | Sakezles |
| 8,007,281 | B2 | 8/2011 | Toly |
| 8,007,282 | B2 | 8/2011 | Gregorio et al. |
| 8,323,028 | B2 | 12/2012 | Matanhelia |
| 8,323,029 | B2 | 12/2012 | Toly |
| 8,328,560 | B2 | 12/2012 | Niblock et al. |
| 8,403,674 | B2 | 3/2013 | Feygin et al. |
| 8,403,675 | B2 | 3/2013 | Stoianovici et al. |
| 8,439,687 | B1 | 5/2013 | Morriss et al. |
| 8,454,368 | B2 | 6/2013 | Ault et al. |
| 8,460,002 | B2 | 6/2013 | Wang et al. |
| 8,469,716 | B2 | 6/2013 | Fedotov et al. |
| 8,480,407 | B2 | 7/2013 | Campbell et al. |
| 8,480,408 | B2 | 7/2013 | Ishii et al. |
| 8,556,635 | B2 | 10/2013 | Toly |
| 8,613,621 | B2 | 12/2013 | Henderickson et al. |
| D699,297 | S | 2/2014 | Bahsooun et al. |
| 8,641,423 | B2 | 2/2014 | Gumkowski |
| 2001/0019818 | A1 | 9/2001 | Yong |
| 2004/0248072 | A1 | 12/2004 | Gray et al. |
| 2005/0008997 | A1 | 1/2005 | Herman |
| 2005/0026125 | A1 | 2/2005 | Toly |
| 2005/0084833 | A1 | 4/2005 | Lacey et al. |
| 2005/0142525 | A1 | 6/2005 | Cotin et al. |
| 2005/0196739 | A1 | 9/2005 | Moriyama |
| 2005/0196740 | A1 | 9/2005 | Moriyana |
| 2005/0214723 | A1 | 9/2005 | Stoianovici et al. |
| 2006/0046235 | A1 | 3/2006 | Alexander et al. |
| 2006/0252019 | A1 | 11/2006 | Burkitt et al. |
| 2006/0275741 | A1 | 12/2006 | Chewning et al. |
| 2007/0148626 | A1 | 6/2007 | Ikeda |
| 2007/0166682 | A1 | 7/2007 | Yarin et al. |
| 2007/0275359 | A1 | 11/2007 | Rotnes et al. |
| 2008/0032273 | A1 | 2/2008 | MacNamara et al. |
| 2008/0064017 | A1 | 3/2008 | Grundmeyer, III |
| 2008/0187895 | A1 | 8/2008 | Sakezles |
| 2008/0299529 | A1 | 12/2008 | Schaller |
| 2009/0068627 | A1 | 3/2009 | Toly |
| 2009/0142739 | A1 | 6/2009 | Wang et al. |
| 2009/0142741 | A1 | 6/2009 | Ault et al. |
| 2009/0176196 | A1 | 7/2009 | Niblock et al. |
| 2009/0187079 | A1 | 7/2009 | Albrecht et al. |
| 2009/0246747 | A1 | 10/2009 | Buckman, Jr. |
| 2010/0099067 | A1 | 4/2010 | Agro |
| 2010/0167249 | A1 | 7/2010 | Ryan |
| 2010/0167250 | A1 | 7/2010 | Ryan et al. |
| 2010/0167253 | A1 | 7/2010 | Ryan et al. |
| 2010/0209899 | A1 | 8/2010 | Park |
| 2010/0279263 | A1 | 11/2010 | Duryea |
| 2011/0200976 | A1 | 8/2011 | Hou et al. |
| 2011/0207104 | A1 | 8/2011 | Trotta |
| 2011/0281251 | A1 | 11/2011 | Mousques |
| 2012/0015339 | A1 | 1/2012 | Hendrickson et al. |
| 2012/0045743 | A1 | 2/2012 | Okano et al. |
| 2012/0082970 | A1 | 4/2012 | Pravong et al. |
| 2012/0115117 | A1 | 5/2012 | Marshall |
| 2012/0115118 | A1 | 5/2012 | Marshall |
| 2012/0148994 | A1 | 6/2012 | Hori et al. |
| 2012/0164616 | A1 | 6/2012 | Endo et al. |
| 2012/0165866 | A1 | 6/2012 | Kaiser et al. |
| 2012/0202180 | A1 | 8/2012 | Stock et al. |
| 2012/0264096 | A1 | 10/2012 | Taylor et al. |
| 2012/0282584 | A1 | 11/2012 | Millon et al. |
| 2012/0308977 | A1 | 12/2012 | Tortola |
| 2013/0101973 | A1 | 4/2013 | Hoke et al. |
| 2013/0157240 | A1 | 6/2013 | Hart et al. |
| 2013/0177890 | A1 | 7/2013 | Sakezles |

(56) References Cited

U.S. PATENT DOCUMENTS

| | | | |
|---|---|---|---|
| 2013/0245681 | A1 | 9/2013 | Straehnz et al. |
| 2014/0030682 | A1 | 1/2014 | Thilenius |
| 2014/0038151 | A1 | 2/2014 | Hart |
| 2014/0051049 | A1 | 2/2014 | Jarc et al. |
| 2014/0072941 | A1 | 3/2014 | Hendrickson et al. |

FOREIGN PATENT DOCUMENTS

| | | |
|---|---|---|
| CN | 2909427 Y | 6/2007 |
| CN | 201364679 Y | 12/2009 |
| CN | 202563792 U | 11/2012 |
| CN | 202601055 U | 12/2012 |
| CN | 202694651 U | 1/2013 |
| CN | 103050040 A | 4/2013 |
| CN | 203013103 U | 6/2013 |
| CN | 203038549 U | 7/2013 |
| CN | 203338651 U | 12/2013 |
| CN | 203397593 U | 1/2014 |
| DE | 41 05 892 | 8/1992 |
| DE | 44 14 832 | 11/1995 |
| DE | 19716341 C2 | 9/2000 |
| FR | 2 691 826 | 12/1993 |
| FR | 2 917 876 | 12/2008 |
| GB | 2488994 A | 9/2012 |
| JP | 10 211160 | 8/1998 |
| JP | 2001005378 A | 1/2001 |
| JP | 2009236963 A | 10/2009 |
| JP | 2013127496 A | 6/2013 |
| MX | PA 02004422 A | 11/2003 |
| PT | 106230 | 9/2013 |
| WO | WO 99/01074 A1 | 1/1999 |
| WO | WO 00/36577 | 6/2000 |
| WO | WO 02/38039 A2 | 5/2002 |
| WO | WO 02/38039 A3 | 5/2002 |
| WO | WO 2005/071639 A1 | 8/2005 |
| WO | WO 2007/068360 | 6/2007 |
| WO | WO 2009/000939 | 12/2008 |
| WO | WO 2010/094730 | 8/2010 |
| WO | WO 2012168287 A1 | 12/2012 |
| WO | WO 2012175993 | 12/2012 |

OTHER PUBLICATIONS

European Patent Office, The International Search Report and Written Opinion for International Application No. PCT/US2012/60997, mailed Mar. 7, 2013, entitled "Simulated Tissue Structure for Surgical Training".

European Patent Office, The International Search Report and Written Opinion for International Application No. PCT/US2012/070971, mailed Mar. 18, 2013, entitled "Advanced Surgical Simulation".

Human Patient Simulator, Medical Education Technologies, Inc., http://www.meti.com (1999) all.

The International Bureau of WIPO, International Preliminary Report on Patentability for International Application No. PCT/US2011/053859, titled "Portable Laparoscopic Trainer" dated Apr. 2, 2013.

European Patent Office, The International Search Report and Written Opinion for International Application No. PCT/US2013/062363, mailed Jan. 22, 2014, entitled "Surgical Training Model for Laparoscopic Procedures".

European Patent Office, The International Search Report and Written Opinion for International Application No. PCT/US2013/061949, mailed Feb. 17, 2014, entitled "Surgical Training Model for Laparoscopic Procedures".

Anonymous: Realsim Systems—LTS2000, Sep. 4, 2005, pp. 1-2, XP055096193, Retrieved from the Internet: URL:https://web.archive.org/web/2005090403; 3030/http://www.realsimsystems.com/exersizes.htm (retrieved on Jan. 14, 2014).

European Patent Office, The International Search Report and Written Opinion for International Application No. PCT/US2013/062269, mailed Feb. 17, 2014, entitled "Surgical Training Model for Transluminal Procedures".

European Patent Office, The International Search Report and Written Opinion for International Application No. PCT/US2013/061557, mailed Feb. 10, 2014, entitled "Surgical Training Model for Laparoscopic Procedures".

European Patent Office, The International Search Report and Written Opinion for International Application No. PCT/US2013/061728 mailed Oct. 18, 2013, entitled "Surgical Training Model for Laparoscopic Procedures".

European Patent Office, The International Search Report and Written Opinion of the International Searching Authority for International Application No. PCT/US2014/038195 titled "Hernia Model", mailed Oct. 15, 2014.

European Patent Office, Invitation to Pay Additional Fees and Where Applicable, Protest Fee, for International Application No. PCT/US2014/038195, titled "Hernia Model", mailed Aug. 4, 2014.

Kurashima, Y et al., A tool for training and evaluation of laparoscopic inguinal hernia repair: The Global Operative Assessment of Laparoscopic Skills—Groin Hernia, American Journal of Surgery, Paul Hoeber, New York, NY, US vol. 201, No. 1 Jan. 1, 2011, pp. 54-61.

European Patent Office, The International Search Report and Written Opinion for International Application No. PCT/US2012/070971, mailed Jul. 4, 2014, entitled "Advanced Surgical Simulation Constructions and Methods".

The International Bureau of WIPO, International Preliminary Report on Patentability for International Application No. PCT/US2012/070971, titled "Advanced Surgical Simulation" dated Jun. 24, 2014.

The International Bureau of WIPO, International Preliminary Report on Patentability for International Application No. PCT/US2012/060997, titled "Simulated Tissue Structure for Surgical Training" dated Apr. 22, 2014.

* cited by examiner

HERNIA MODEL

CROSS-REFERENCE TO RELATED APPLICATIONS

This application claims priority to and benefit of U.S. Provisional Patent Application Ser. No. 61/823,834 entitled "Hernia model" filed on May 15, 2013 and U.S. Provisional Patent Application Ser. No. 61/973,999 entitled "Hernia model" filed on Apr. 2, 2014, all of which are incorporated herein by reference in their entirety.

FIELD OF THE INVENTION

This application relates to surgical training tools, and in particular, to simulated tissue structures and models for teaching and practicing the repair of a hernia.

BACKGROUND OF THE INVENTION

A hernia is the protrusion of an organ or the fascia of an organ through the abdominal wall. This occurs when the abdominal walls weaken either from incorrect formation at birth, recent surgery or trauma. The most common types of hernias are inguinal and incisional. Inguinal hernias occur in the groin area in both males and females but they are most common in men to the right and left of the midline where the spermatic cords and arteries pass through the spaces in the abdominal wall. There are three possible spaces in the abdominal wall for the hernia to pass through: direct, indirect and femoral. The direct space is medial to the epigastric vessels while the indirect space is lateral to the epigastric vessels. A femoral hernia occurs when the organs protrude through a large femoral ring into the femoral canal. Incisional hernias occur after a surgery when the abdominal wall does not heal correctly, causing the internal organs and fascia to push through.

Hernias can be repaired by either open or laparoscopic surgery. In laparoscopic surgery, a trocar is inserted to access a body cavity and to create a channel for the insertion of a camera, such as a laparoscope. The camera provides a live video feed capturing images that are then displayed to the surgeon on one or more monitors. Another trocar is inserted to create a pathway through which surgical instruments can be passed for performing procedures observed on the monitor. The targeted tissue location such as the abdomen is typically enlarged by delivering carbon dioxide gas to insufflate the body cavity and create a working space large enough to accommodate the scope and instruments used by the surgeon. The insufflation pressure in the tissue cavity is maintained by using specialized trocars. Laparoscopic repair has many advantages over the traditional open surgery repair including quicker recovery and less pain. Therefore, it is often more desirable for the patient to undergo a laparoscopic repair. However, laparoscopic repair requires an experienced surgeon. In order for surgeons to practice laparoscopic hernia repairs, a realistic, anatomically correct model for use in a laparoscopic training device is needed.

Generally, there are two ways to repair an inguinal hernia laparoscopically. The first and more often taught way is called transabdominal pre-peritoneal (TAPP). The TAPP approach involves placing the laparoscopic instruments all the way into the insufflated abdominal cavity and approaching the hernia from below by cutting a hole in the peritoneum. The hernia is then resected, mesh is placed over the weakened abdominal wall and the peritoneum is closed. The second way of reducing an inguinal hernia is called total extraperitoneal (TEP). The TEP approach is more difficult since it involves entering the space between the peritoneum and the abdominal wall without puncturing the peritoneum. Once the trocar has been inserted into that space, a balloon is used to open up the space to allow for easier movement of the instruments and less blunt dissection. When the balloon is removed, the space is insufflated and the hernia is found in that same plane. When the hernia is found, it is resected back into the abdominal cavity, the peritoneum laid flat and mesh placed over the weakened abdominal wall. When surgeons are learning how to perform laparoscopic surgery, they are taught TAPP first since like most other laparoscopic procedures, it is performed inside the abdominal cavity. TEP is considered more advanced and surgeons need a way to safely learn and practice the procedure. Due to the need for a safe practice model for both beginner surgeons learning TAPP as well as more advanced surgeons learning TEP, a hernia model that allows for both procedures to be practiced is needed.

In order to help patient outcomes and recoveries, surgeons need a way to practice laparoscopic hernia repairs outside of the operating room. The practice model needs to be anatomically correct and include all important landmarks normally seen during surgery in order to give the surgeon or resident the most realistic practice possible. Additionally, the model should allow the surgeon to practice incisional and inguinal (TAPP and TEP) procedures.

SUMMARY OF THE INVENTION

According to one aspect of the invention, an anatomical model for surgical training is provided. The model includes a simulated abdominal wall located at a first end of the model. The simulated abdominal wall has an inner surface and an outer surface. The simulated abdominal wall includes at least one opening extending between the inner surface and the outer surface defining a hernia opening. The model includes a simulated peritoneum located at a second end of the model. The simulated peritoneum has an inner surface and an outer surface. The simulated peritoneum is connected and adjacent to the simulated abdominal wall such that the simulated abdominal wall and the simulated peritoneum are substantially coplanar when in an open configuration and the inner surface of the simulated abdominal wall and the inner surface of the peritoneum together define a common inner surface and an overall flexible model. The model further includes a first layer of synthetic tissue. The first layer of synthetic tissue has a bottom surface and a top surface. The first layer of synthetic tissue overlays at least a portion of the simulated abdominal wall. At least part of the first layer is selectively adhered to the simulated abdominal wall and, in another variation, at least part of the first layer is adhered to the simulated abdominal wall and to the simulated peritoneum. The model further includes a plurality of simulated tissue components positioned between the first layer and the simulated abdominal wall. At least some of the simulated tissue components are adhered, at least in part, to at least one of the first layer, the simulated peritoneum, and the simulated abdominal wall. The model has a curved configuration. When in the curved configuration, part of the simulated abdominal wall is located above the simulated peritoneum and a cavity is defined between the simulated abdominal wall and the simulated peritoneum with the first end and the second end defining, in part, an opening into the cavity. In one variation, the model includes a spring layer that extends through the simulated abdominal wall and the simulated peritoneum.

According to another aspect of the invention, an anatomical model for surgical training is provided. The model includes a simulated abdominal wall located at a first end of the model. The simulated abdominal wall has an inner surface and an outer surface. The simulated abdominal wall has at least one opening extending between the inner surface and the outer surface. The model includes at least a portion of a simulated pelvis that is located at a second end of the model. The simulated pelvis has an inner surface and an outer surface. The simulated pelvis is connected and adjacent to the simulated abdominal wall such that the inner surface of the simulated abdominal wall and the inner surface of the simulated pelvis define a common inner surface of the model. The model further includes a first layer of synthetic tissue having a bottom surface and a top surface. The first layer of synthetic tissue overlays at least a portion of the simulated pelvis and at least a portion of the simulated abdominal wall. The first layer of synthetic tissue is adhered to at least a portion of the simulated pelvis and to at least a portion of the simulated abdominal wall. The first layer includes at least one opening aligned with the at least one opening in the simulated abdominal wall. The model includes a second layer of synthetic tissue having a bottom surface and a top surface. The second layer of synthetic tissue overlays at least a portion of the top surface of the first layer. The second layer includes at least one opening aligned with the at least one opening in the simulated abdominal wall. The model further includes a plurality of simulated tissue components positioned between the first layer of synthetic tissue and the second layer of synthetic tissue. At least some of the plurality of simulated tissue components is adhered, at least in part, to at least one of the first layer of synthetic tissue and the second layer of synthetic tissue. The model further includes a synthetic peritoneum overlaying at least one of the simulated abdominal wall and the simulated pelvis and is located above the second layer of synthetic tissue. At least a portion of the synthetic peritoneum is removably pushed into one of the openings in the simulated abdominal wall to simulate a hernia.

According to another aspect of the invention, a surgical simulation system for practicing hernia repair is provided. The surgical simulation system includes a hernia model placed inside a surgical training device. The hernia model includes a simulated abdominal wall located at a first end of the model. The simulated abdominal wall has an inner surface and an outer surface. The simulated abdominal wall has at least one opening extending between the inner surface and the outer surface. The hernia model includes at least a portion of a simulated pelvis located at a second end of the hernia model. The simulated pelvis has an inner surface and an outer surface. The simulated pelvis is connected to the simulated abdominal wall such that the inner surface of the simulated abdominal wall and the inner surface of the simulated pelvis define a common inner surface of the model. The hernia model includes a first layer of synthetic tissue having a bottom surface and a top surface. The first layer of synthetic tissue overlays at least a portion of the simulated pelvis and at least a portion of the simulated abdominal wall. The first layer is adhered to at least a portion of the simulated pelvis and to at least a portion of the simulated abdominal wall. The first layer includes at least one opening aligned with the at least one opening in the simulated abdominal wall. The model further includes a second layer of synthetic tissue having a bottom surface and a top surface. The second layer overlays at least a portion of the top surface of the first layer. The second layer includes at least one opening aligned with the at least one opening in the simulated abdominal wall and the at least one opening in the first layer. The hernia model also includes a plurality of simulated tissue components positioned between the first layer of synthetic tissue and the second layer of synthetic tissue. At least some of the plurality of simulated tissue components are adhered, at least in part, to at least one of the first layer of synthetic tissue and the second layer of synthetic tissue. The model further includes a synthetic peritoneum overlaying at least a portion of the simulated abdominal wall and at least a portion of the simulated pelvis. The synthetic peritoneum is positioned above the second layer of synthetic tissue. The surgical training device includes a base and a top cover connected to and spaced apart from the base to define an internal cavity. The internal cavity is at least partially obstructed from direct observation by a user and is configured for practicing laparoscopic surgical techniques. The top cover includes an aperture or penetrable simulated tissue region for the passage of surgical instruments into the internal cavity. The hernia model is positioned inside the internal cavity.

According to another aspect of the invention, a model that allows surgeons and residents to practice incisional and inguinal hernia repairs is provided. The model is a clam-shaped and simulates the insufflated space between the abdominal muscles and peritoneum. A hole is provided in the model from which a simulated peritoneum and/or simulated bowel protrudes to create a simulated hernia. The model contains all important anatomical structures including Cooper's ligament, the iliopubic tract, the pubic ramus bone, the medial umbilical ligament, the triangle of doom, triangle of pain and the spermatic cords. The model is covered with a layer of simulated tissue to allow users to practice dissecting in order to find and navigate the important anatomical landmarks and to safely repair the hernia. Additionally, the model is designed with a thick abdominal wall to allow the surgeon to practice tacking mesh to repair the hernia. Silicone is used to create the thick abdominal walls, simulated anatomical structures and synthetic tissue. A spring layer may be incorporated to provide realistic resiliency to the model while maintaining a simulated insufflated space configuration or curved configuration. The model may be used to selectively simulate direct, indirect and femoral inguinal hernia repairs as well as incisional hernia repairs by removably placing the protruding simulated tissue into any one of three openings in the model. The model sits on a base or frame that imparts and maintains the clam shape or is connected to a rigid simulated pelvis. When located inside a laparoscopic trainer with an angled top cover to simulate a Trendelenburg position of the patient, the model provides an ideal simulation for teaching and practicing laparoscopic hernia repair.

DETAILED DESCRIPTION OF THE INVENTION

Figure 1:
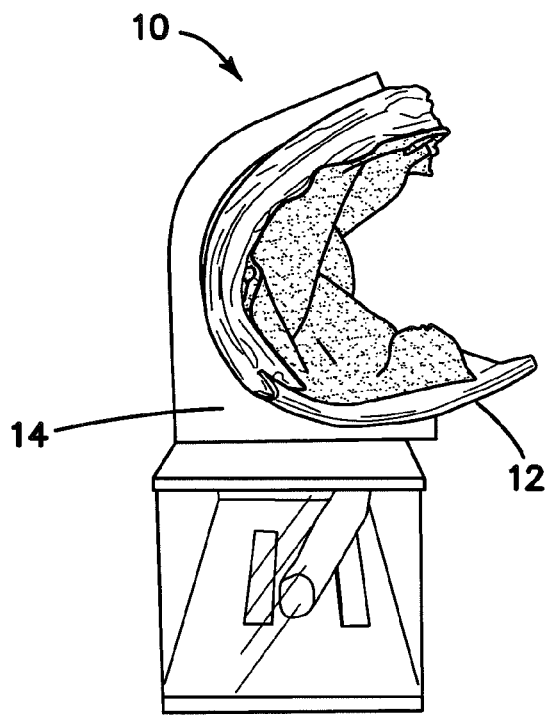
FIG. 1 is a side perspective view of a hernia model according to the present invention.
Figure 2:
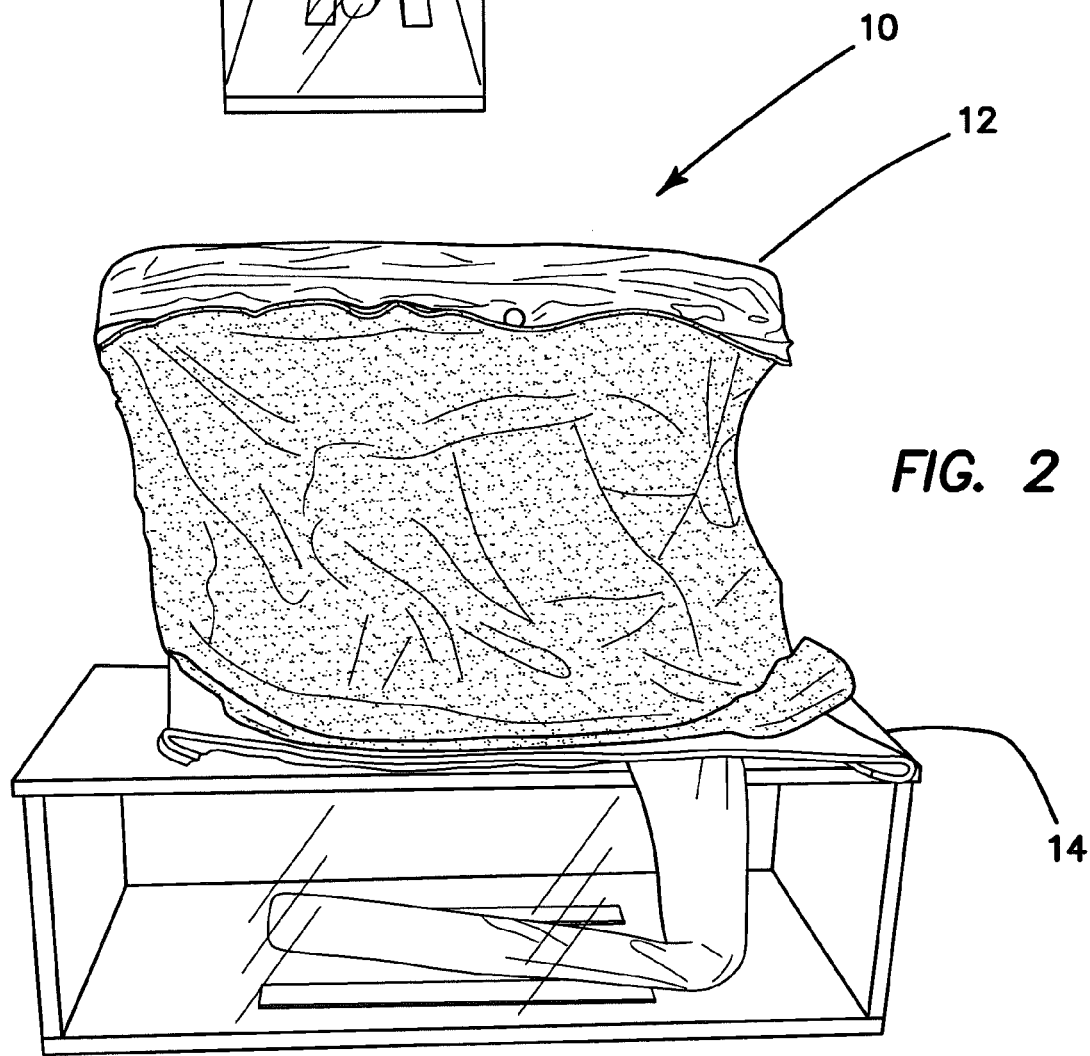
FIG. 2 is a front perspective view of a hernia model according to the present invention.
Figure 3:
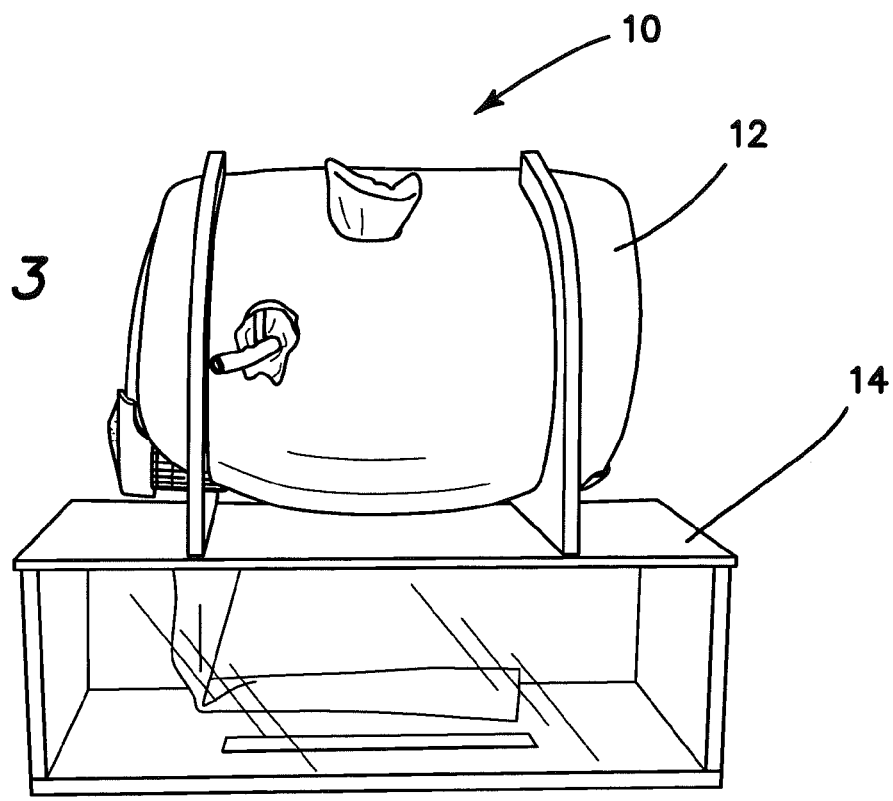
FIG. 3 is rear perspective view of a hernia model according to the present invention.

Referring to FIGS. 1-3, there is shown a side, front and rear view, respectively, of a hernia model 10 according to the present invention. The hernia model 10 includes an anatomical portion 12 supported by a frame 14. As seen most clearly in FIG. 1, the substantially planar anatomical portion 12 is maintained in a curved configuration such that the major part of the anatomical portion 12 is substantially C-shaped forming a half or open generally cylindrical configuration. The concavity formed inside the C-shaped disposition of the anatomical portion 12 advantageously simulates an insufflated space between an artificial muscular abdominal wall generally located at the top of the C shape and the simulated peritoneum 18 generally located at the bottom of the C shape. The simulated muscular abdominal wall forms approximately the top half or more than the top half of the C-shaped curve; whereas, the bottom half or less than the bottom half of the C-shaped curve is formed by the simulated peritoneum 18. The open clamshell-like configuration advantageously provides a realistic surgical approach to repairing a hernia when viewed by the user from the front of the hernia model 10 as in FIG. 2.

The frame or stand 14 divides the hernia model 10 into an upper portion and a lower portion. The lower portion constitutes approximately one-third of the entire height of the hernia model 10 and simulates the abdominal cavity beneath the peritoneum. The lower portion contains that part of the anatomical portion 12 such as the simulated bowel that protrudes through the simulated peritoneum 18 and through the simulated muscular abdominal wall. The upper portion contains the anatomical portion 12. FIGS. 1-3 illustrate a simulated bowel residing in the lower portion and extending upwardly through an opening in the peritoneum 18 into the concavity of the upper portion. The simulated bowel crosses the concavity of the insufflated space and exits through an opening in the muscular abdominal wall to simulate a hernia. One or more exit openings in the simulated muscular abdominal wall of the anatomical portion 12 is provided to simulate the possible spaces in the abdominal wall for the hernia to pass through. Generally, there are three spaces through which a hernia may pass. These spaces are the direct space, the indirect space and the femoral space. If all three openings are provided in the hernia model, the distal end of simulated bowel is inserted into any one of the exit openings for practicing hernia repair through any of the three spaces. The surgeon practices approaching the simulated insufflated space of the hernia model 10 from the front, either from below the peritoneum or above the peritoneum for practicing TAPP or TEP, respectively. The surgeon visualizes the insufflated space, practices carefully dissecting simulated fascia layers, identifying a variety of visual anatomical markers, navigating around them to approach the bowel, resecting the hernia and placing mesh to patch and close any spaces.

Figure 4:
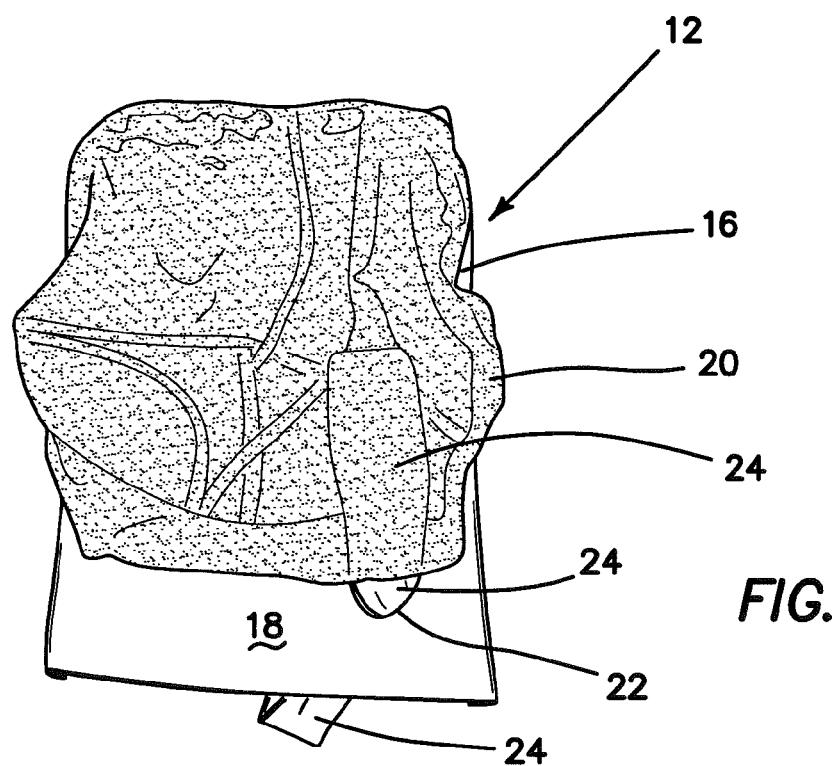
FIG. 4 is a top view of an anatomical portion of a hernia model according to the present invention.

The anatomical portion 12 of the hernia model 10 will now be described in detail with reference to FIGS. 4-8. Turning to FIG. 4, there is shown a top view of an anatomical portion 12 of the hernia model 10. The anatomical portion 12 is a substantially planar object having varying thickness and materials. The anatomical portion 12 includes a simulated muscular abdominal wall portion 16 interconnected in substantially the same plane to a simulated peritoneum portion 18. Aside from the relatively thicker abdominal wall portion 16 relative to the peritoneum portion 18, both the abdominal wall portion 16 and peritoneum portion 18 are substantially coplanar. In human anatomy, the layers of the abdominal wall are from superficial to deep: 1) skin, 2) fascia, 3) muscle, which includes the rectus abdominis, external oblique muscle, internal oblique muscle and transverse abdominal muscle, 4) fascia transversalis, and 5) peritoneum. These abdominal layers are sandwiched or layered above each other to form part of the abdominal wall portion 16. In the present invention, one or more layers representing muscle are positioned substantially coplanar with or otherwise adjacent to the simulated peritoneum portion. In this arrangement, the top side (anterior facing surface) of the simulated peritoneum 18 is substantially coplanar or adjacent to the bottom side (posterior facing surface) of the simulated muscular abdominal wall portion 16 such that when the substantially planar anatomical portion 12 is curved into a C-shape configuration the bottom side of the simulated muscular abdominal wall portion 16 faces and is spaced apart from the top side of the simulated peritoneum 18. The interior portion of the C-shaped structure simulates an insufflated space. In real surgery, the insufflated space is created by inserting a trocar between the muscle layer and peritoneum and delivering fluid such as carbon dioxide gas under pressure from the proximal end of the trocar to the distal end of the trocar to spread apart the muscle layer from the peritoneum to create a working space. The simulated insufflation cavity of the present invention is the concavity of the C-shaped orientation which is approximately 5 inches in height and approximately 10 inches in length. As can be seen in FIG. 4, the simulated muscular abdominal wall portion 16 is approximately 8 inches long and approximately 7.5 inches wide and is adjacent to the simulated peritoneum 18 which is approximately 3 inches long and approximately 7.5 inches wide. When formed into a clamshell configuration, the simulated muscular abdominal wall portion 16 is disposed at the top of the hernia model 10 and follows the C-shaped curve down beyond the halfway mark of the C-shape. The simulated peritoneum 18 is disposed at the bottom of the C-shape and curves upwardly approximately a third of the way along the C-shape when the anatomical portion 12 is formed into a clamshell. Overall, the substantially planar anatomical portion 12 is approximately 7.4 inches wide and approximately 11 inches long. The anatomical portion 12 further includes a simulated fascia layer 20 located on the inner surface of the anatomical portion 12. The simulated fascia layer 20 is a thin layer that is partially translucent and draped over the simulated muscular abdominal wall 16. The simulated fascia layer 20 is glued with adhesive in one or more locations and generally does not extend to completely over the simulated peritoneum 18 when laid flat as shown in FIG. 4. The simulated peritoneum 18 includes an opening 22 simulating the location of a ruptured peritoneum through which a simulated bowel 24 protrudes above the inner or top surface of the peritoneum 18. The simulated bowel 24 is part of the anatomical portion 12 although it is loosely connected thereto such that the simulated bowel 24 may be moved, pulled and pushed through the opening 22 and other spaces.

Figure 5:
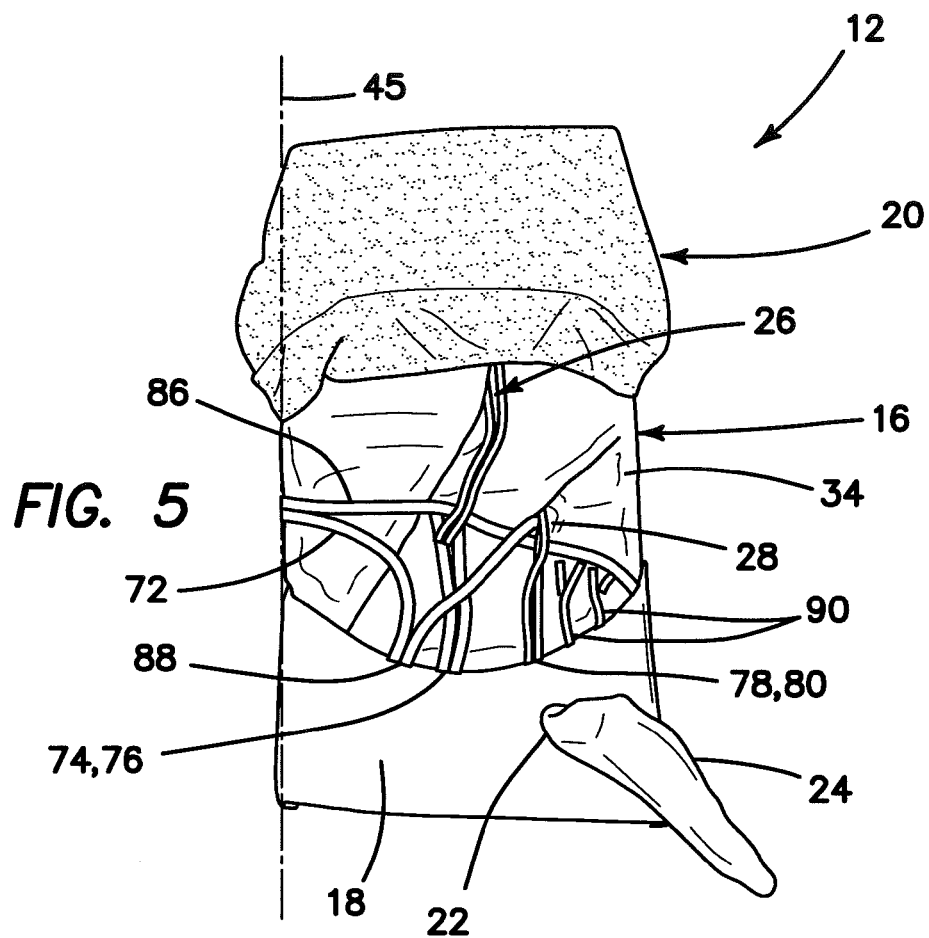
FIG. 5 is a top view of an anatomical portion of a hernia model according to the present invention.
Figure 6:
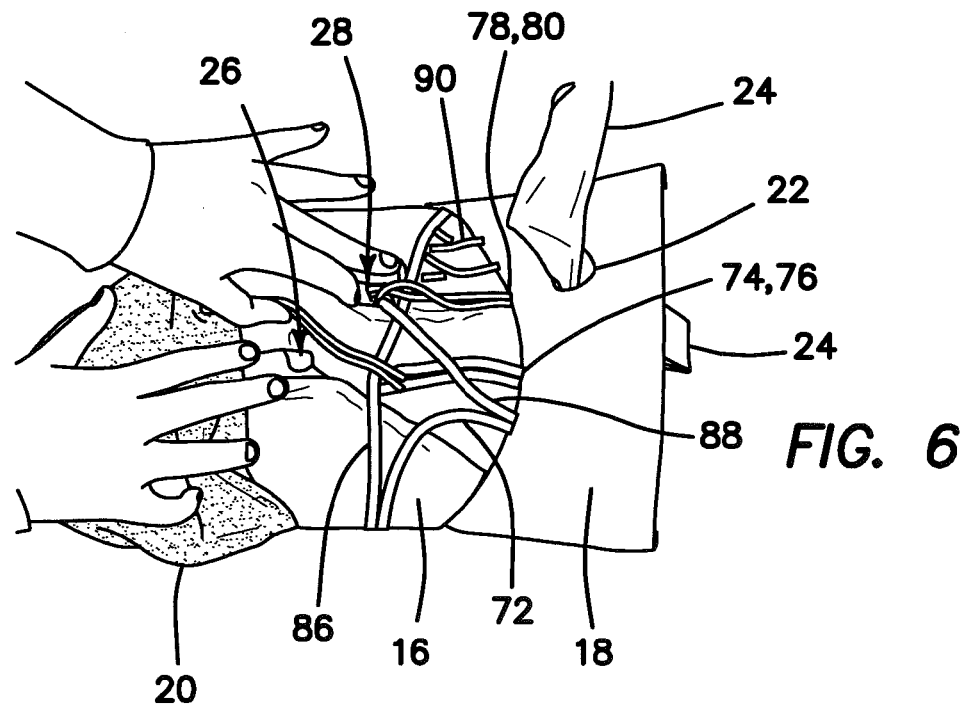
FIG. 6 is a top view of an anatomical portion of a hernia model with human hands shown retracting simulated tissue according to the present invention.

Turning to FIG. 5, there is shown a top view of the anatomical portion 12 with the simulated fascia layer 20 uncovering the underlying simulated muscular abdominal wall 16. Various anatomical structures are provided on the surface of the simulated muscular abdominal wall 16. These landmarks include but are not limited to Cooper's ligament 72, vas deferens 88, external iliac vessels 74, 76, spermatic vessels 78, 80, nerves 90, and iliopubic tract 86 arranged as labeled in FIG. 5. A piece of hard plastic (not shown) may also be embedded to simulate a femoral bone. In addition to opening 22 in the simulated peritoneum 18, one or more additional openings are formed through the simulated muscular abdominal wall 16. These additional openings define exit openings or spaces through which the bowel protrudes in a hernia. In FIG. 5, a first opening 26 and a second opening 28 are formed through the simulated muscular abdominal wall 16 to simulate the direct space and indirect space, respectively. FIG. 6 illustrates the first and second openings 26, 28 more clearly. Also visible in both FIGS. 5 and 6 is the curved intersection between the simulated muscular abdominal wall 16 and the simulated peritoneum 18. The simulated bowel 24 is passed through the opening 22 in the simulated peritoneum 18 such that the distal end resides above the inner surface and at least a portion of the simulated bowel 24 is above the top surface of the peritoneum 18. The distal end of the simulated bowel 24 is then passed into either of the first opening 26 or second opening 28 to simulate a hernia located in the direct or indirect space, respectively. In FIG. 4, the simulated bowel 24 is shown passed into the second opening 28 representing the indirect space. The hernia model 10 simulates a portion of the anatomy lateral to the midline 45 of a patient.

Figure 7:
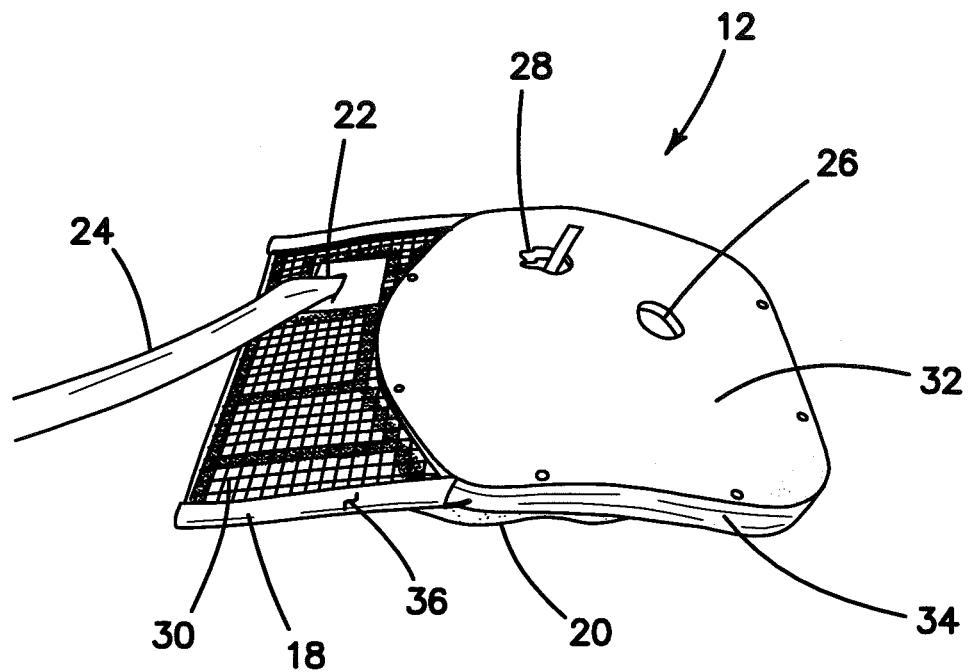
FIG. 7 is a bottom perspective view of an anatomical portion of a hernia model according to the present invention.
Figure 8:
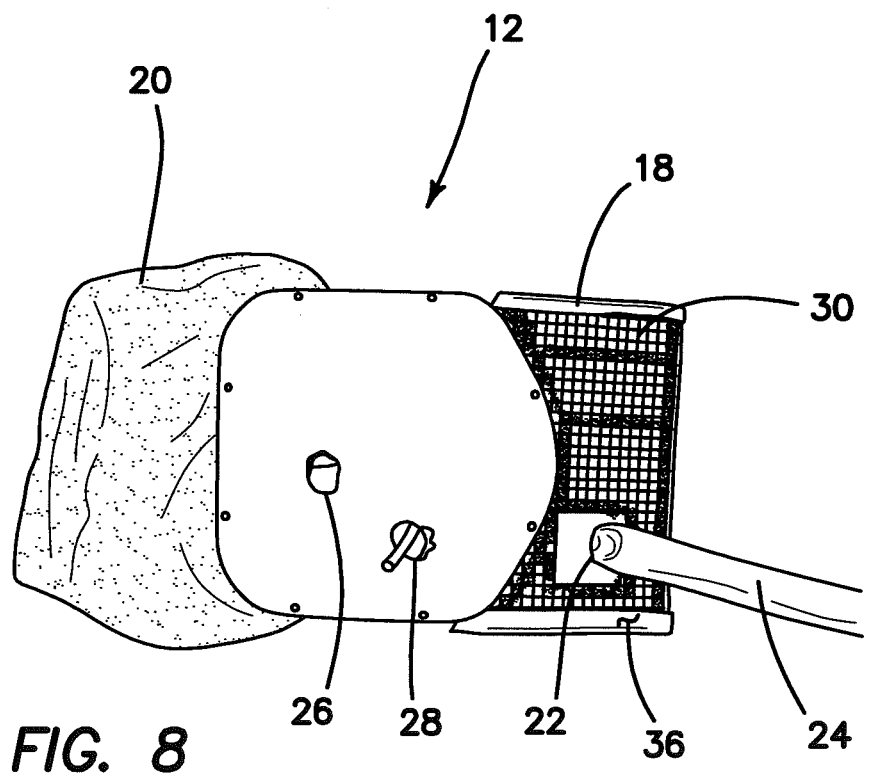
FIG. 8 is bottom view of an anatomical portion of a hernia model according to the present invention.

Turning now to FIGS. 7 and 8, there is shown a perspective and bottom view of the outer surface of the anatomical portion 12. The anatomical portion 12 is built upon a layer of flexible wire mesh 30 such as chicken wire. The wire mesh material 30 is made of thin, flexible galvanized steel wire crisscrossing to form small square or other-shaped windows. The outer surface of the wire mesh layer 30 is covered with a first layer of silicone 32 which is glued to the wire mesh layer 30. The inner surface of the wire mesh layer 30 is covered with a second layer of silicone 34 sandwiching the wire mesh layer 30 between the first and second layers of silicone 32, 34 forming the simulated muscular abdominal wall 16 at one end of the anatomical portion 12. At the other end of the anatomical portion 12, the inner surface of the wire mesh 30 is covered with a yellow foam layer 36 forming the simulated peritoneum 18. The yellow foam layer 36 that is approximately 1/16 of an inch thick is adhered to inner surface of the mesh layer with adhesive with the outer edges of the yellow foam layer 36 being wrapped over the outer edges of the mesh layer 30. The yellow foam layer 36 forms the finished inner surface of one end of the anatomical portion 12. The simulated muscular abdominal wall 16 comprising the first and second silicone layers 32, 34 and wire mesh layer 30 is approximately 0.75 inches thick. The same wire mesh layer or frame 30 extends throughout the anatomical portion 12 defining the general plane of the anatomical portion 12. The simulated peritoneum 18 is substantially thinner than the simulated muscular abdominal wall 16 although still generally coplanar and adjacent to the simulated abdominal wall 16. The thick simulated muscular abdominal wall 16 permits the surgeon to tack surgical mesh to the abdominal wall to practice patching the hernia.

With reference back to FIGS. 5-6, the inner surface of the second silicone layer 34 is populated with a variety of anatomical landmarks as mentioned above. The second silicone layer 34 is textured and additional silicone layers may be employed above the second layer 34 to complete the anatomical geography. The tubular simulated vessels and nerves are made of silicone and have diameters of approximately 0.185 inches. The simulated Cooper's ligament 72, iliopubic tract 86 and vas deferens 88 are also made of silicone and have diameters of approximately 0.25 inches. The thick external iliac vessels 74, 76 are made of silicone and have a diameter of approximately 0.25-0.375 inches. These tubular structures are made by pouring uncured silicone into straw like tubes and removed them after they solidify. The simulated bowel 24 is made from a thin layer of pink-colored silicone. The silicone comprising the iliopubic tract 86, Cooper's ligament 72 and vas deferens 88 is colored white, the nerves are colored yellow, the external iliac vein 74 and spermatic vein 78 are blue, the external iliac artery 76 and the spermatic artery 80 are red and the remaining vessels are red or pink.

Figure 9:
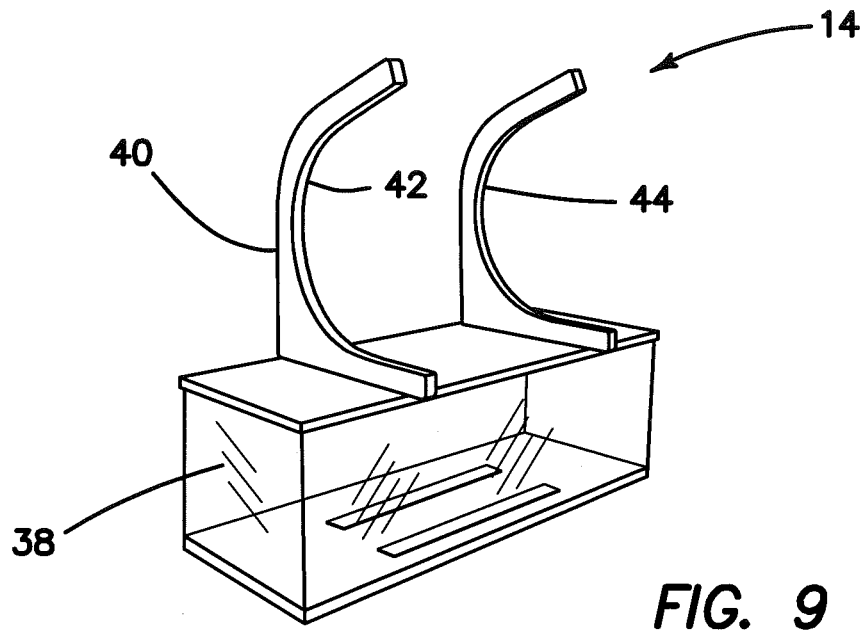
FIG. 9 is a top perspective view of a frame of a hernia model according to the present invention.

Turning now to FIG. 9, there is shown a perspective view of a frame 14 configured to hold the anatomical portion 12 of the hernia model 10 according to the present invention. The frame 14 includes a rectangular lower frame portion 38 and an upper frame receiving portion 40. The lower frame portion 38 is configured to house excess simulated bowel 24 that is simulated to reside below the peritoneum. The lower frame portion 38 includes a base and two or more upwardly extending side walls to form a rectangular container with a top wall. At least one opening is provided, for example via an open side, into the lower frame portion 38. The upper frame portion 40 is configured to receive the anatomical portion 12 and retain the anatomical portion 12 in a clamshell or C-shaped orientation. As such, the upper frame portion 40 includes a C-shaped receiving portion to receive and retain the anatomical portion in a C-shaped configuration. In FIG. 9, the C-shaped receiving portion is formed by two upwardly extending C-shaped claws or prongs 42, 44 that are attached to a top wall of the lower frame portion 38. Any number of C-shaped prongs 42, 44 including a wide singular prong may be employed to retain the anatomical portion 12. The lower frame portion 14 is approximately 10.5 inches wide, approximately 4 inches deep and 3.5 inches tall. The C-shaped prongs 42, 44 are approximately 6 inches in height and each have a concavity that is approximately 4 inches deep.

As described above, the anatomical portion 12 is substantially planar and made of flexible silicone, flexible foam and flexible wire mesh. The wire mesh layer 30 advantageously imparts the anatomical portion 12 with a resiliency that permits the planar anatomical portion 12 to be bent into a substantially semi-cylindrical or C-shaped configuration and placed into the C-shaped receiving prong(s) of the frame 14. The mesh layer 30 acts as a spring layer such that when the anatomical portion 12 is bent and inserted into the frame 14, it exhibits a biasing force against the frame 14 advantageously keeping the anatomical portion 12 in position. Removability of the anatomical portion 12 allows for interchangeability of the anatomical portion 12 after it has been used several times for replacement, repair, reconstruction and compact transport. When the anatomical portion 12 is removed from the frame 14, the resilient mesh layer 30 aids in springing the anatomical portion 12 back to its substantially planar orientation. Hence, the mesh spring layer advantageously keeps the silicone and foam layers 32, 34 and 36 from collapsing onto itself while in the clam shape.

Although the hernia model 10 is described above to be comprised of an anatomical portion 12 that is separate from the frame 14, one skilled in the art will recognize that, in an alternative variation, the hernia model 10 can be constructed such that the frame 14 and anatomical portion 12 is formed integrally as one piece. Furthermore, although the hernia model 10 of the present invention may be used to practice hernia repair in a simulated open surgical procedure, the hernia model 10 is also advantageously configured for practicing laparoscopic hernia repair, in particular, employing the TEP approach. As such, the hernia model 10 of the present invention is configured to function together with a specialized laparoscopic trainer which will now be discussed in detail.

Figure 10:
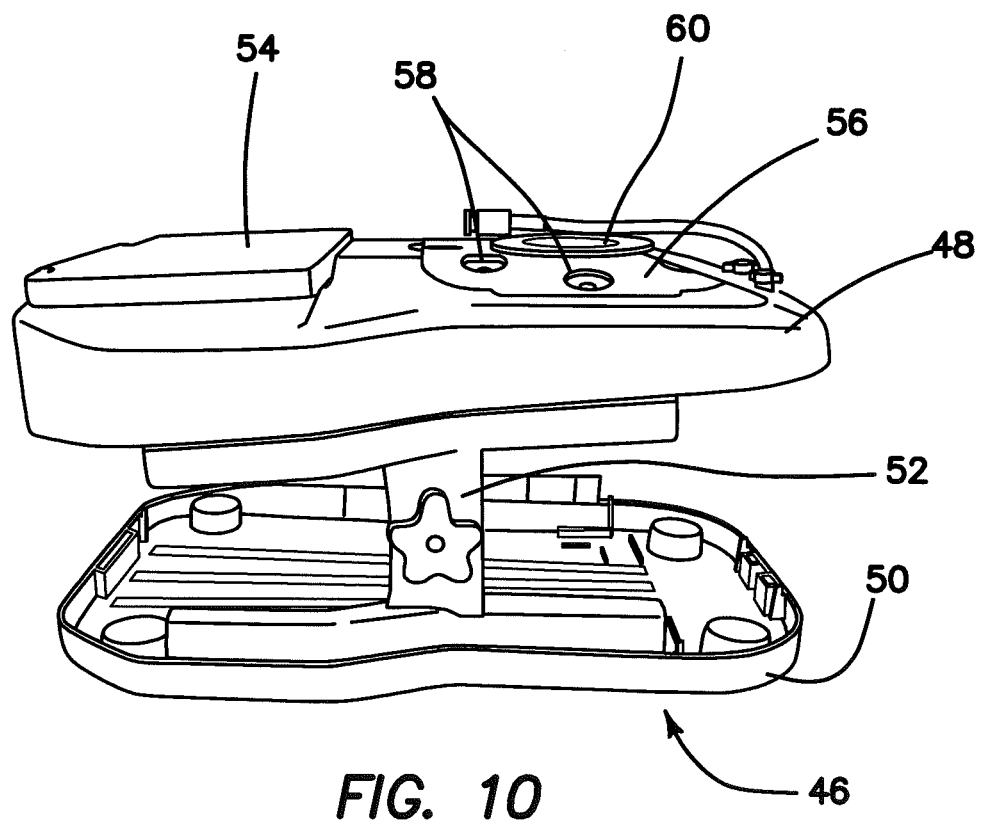
FIG. 10 is a side perspective view of a laparoscopic trainer.

Turning now to FIG. 10, there is shown a laparoscopic trainer 46. The laparoscopic trainer 46 is described in co-pending U.S. patent application Ser. No. 13/248,449 entitled "Portable laparoscopic trainer" and filed on Sep. 29, 2011 by Pravong et al. to Applied Medical Resources Corporation and published as U.S. Patent Publication No. 2012/0082970, hereby incorporated by reference in its entirety herein. The laparoscopic trainer 46 includes a top cover 48 connected to a base 50 by a pair of legs 52 spacing the top cover 48 from the base 50. The laparoscopic trainer 46 is configured to mimic the torso of a patient such as the abdominal region. The top cover 48 is representative of the anterior surface of the patient and the space between the top cover 48 and the base 50 is representative of an interior of the patient or body cavity where organs reside. The laparoscopic trainer 46 is a useful tool for teaching, practicing and demonstrating various surgical procedures and their related instruments in simulation of a patient. Surgical instruments are inserted into the cavity through pre-established apertures 58, 60 in the top cover 48. These pre-established apertures may include seals that simulate trocars or may include simulated tissue 60 that simulates the patient's skin and abdominal wall portions. Various tools and techniques may be used to penetrate the top cover 48 to perform mock procedures on model organs placed between the top cover 48 and the base 50 such as the hernia model 10. When placed inside the cavity of the trainer 46, the hernia model 10 is generally obscured from the perspective of the user who can then practice performing surgical techniques laparoscopically by viewing the surgical site indirectly via a video feed displayed on a video monitor.

A video display monitor 54 that is hinged to the top cover 48 is shown in a closed orientation in FIG. 10 and in an open orientation in FIGS. 11-14. The video monitor 54 is connectable to a variety of visual systems for delivering an image to the monitor 54. For example, a laparoscope inserted through one of the pre-established apertures 58, 60 or a webcam located in the cavity and used to observe the simulated procedure can be connected to the video monitor 54 and/or a mobile computing device to provide an image to the user. In another variation, the top cover 48 does not include a video display but includes means for supporting a laptop computer, a mobile digital device or tablet such as an IPAD® and connecting it by wire or wirelessly to the trainer 46.

When assembled, the top cover 48 is positioned directly above the base 50 with the legs 52 located substantially at the periphery and interconnected between the top cover 48 and base 50. The top cover 48 and base 50 are substantially the same shape and size and have substantially the same peripheral outline. Although the trainer 46 has no sidewalls, the legs 52 partially obscure the internal cavity from view from an otherwise open-sided trainer 46. The top cover 48 includes a first insert 56 removable and replaceable with respect to the top cover 48, in particular, insertable into and removable from an opening formed in the top cover 48. The first insert 56 includes a plurality of apertures 58 to serve as fixed insertion ports for a variety of instruments. The apertures 58 may include various seals. The first insert 56 also includes a tissue simulation region 60 for simulating the skin or several layers of tissue. In one embodiment, the tissue simulation region 60 is configured as a second insert provided within the first insert 56. The second insert is removable and replaceable via snap-fit, friction fit or threaded engagement or other means with respect to the top cover 48 or with respect to the first insert 56 if provided.

Figure 11:
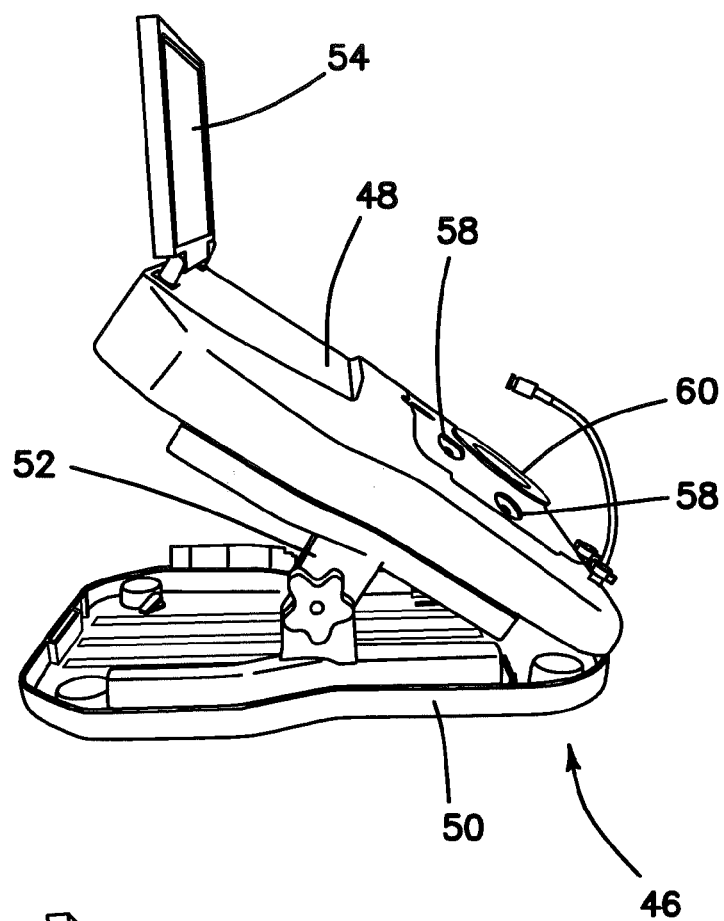
FIG. 11 is a side perspective view of a laparoscopic trainer with an angled top cover.

Turning now to FIG. 11, the laparoscopic trainer 46 includes a top cover 48 that angulates with respect to the base 50. The legs 52 are configured to permit the angle of the top cover 48 with respect to the base 50 to be adjusted. FIG. 11 illustrates the trainer 46 adjusted to an angulation of approximately 30-45 degrees with respect to the base 50 and in another variation approximately 30-35 degrees. The angulation of the trainer 46 advantageously simulates a patient in a Trendelenburg or reverse Trendelenburg position. In the Trendelenburg position the body is tilted such that it is laid flat on the back with the feet higher than the head or vice versa. The Trendelenburg position allows better access to the pelvic organs as gravity pulls the intestines away from the pelvis to thereby prevent encroachment of the intestines upon the pelvic operating field to provide more working space inside the abdominal cavity in which the surgeon can more easily manipulate organs. The selected angulation of the top cover 48 is locked by tightening thumbscrews provided on the legs 52. The angulation of the top cover 48 of the trainer 46 with respect to the base 50 is particularly advantageous with respect to accommodating the hernia model 10 of the present invention.

Figure 12:
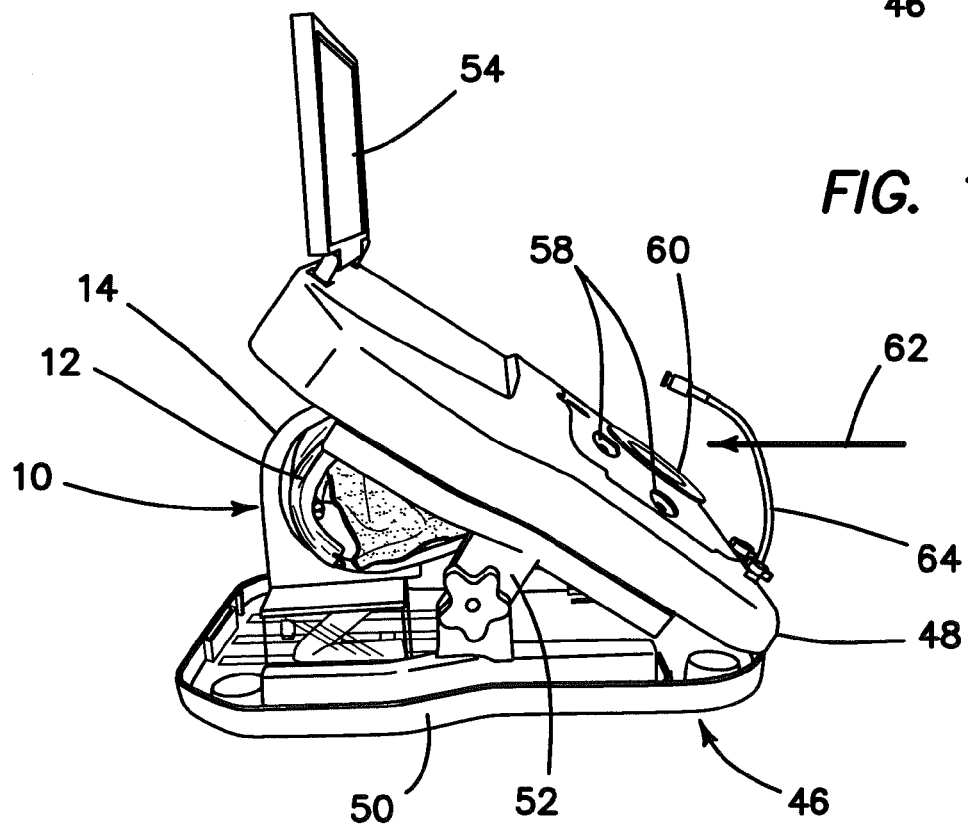
FIG. 12 is a side perspective view of a laparoscopic trainer with a hernia model according to the present invention.
Figure 13:
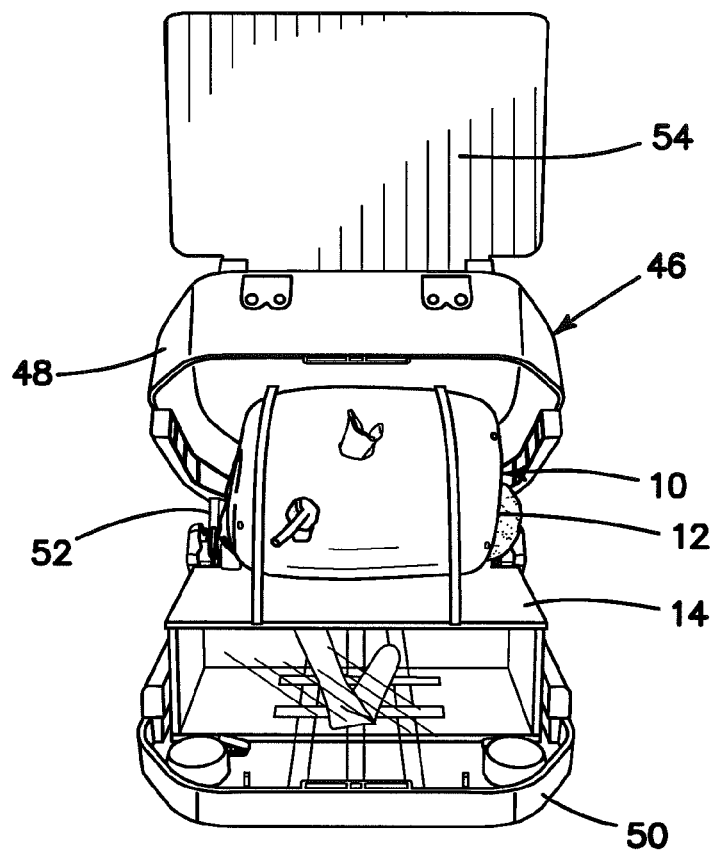
FIG. 13 is a rear perspective view of a laparoscopic trainer with a hernia model according to the present invention.

With the top cover 48 angled as shown in FIG. 11, the hernia model 10 is inserted into the cavity of the trainer 46 and positioned between the top cover 48 and base 50 as shown in FIG. 12. The rear view of the trainer 46 with the hernia model 10 inserted is shown in FIG. 13. As described above, the anatomical portion 12 of the hernia model 10 is held in a C-shaped configuration in frame 14 such that the opening to the C-shape or opening to the clamshell is oriented approximately 90 degrees from the vertical. In other words, if the anatomical portion 12 is considered to be substantially U-shaped with the opening to the U facing upwardly, when the U is turned 90 degrees on its side, a substantially C-shaped configuration is created. With the hernia model 10 inserted into the trainer 46, the opening of the C shape faces the front of the trainer 46 or, in other words, the opening or concavity of the C shape faces the top cover 48. If the top cover 48 was not angled, the concavity of the C shape would not face the top cover 48 and, instead, the opening of the C shape would face the front side between the top cover 48 and the base 50. The top cover 48 is angled such that the top cover 48 is positioned between the user and the hernia model 10 obscuring the opening of the C shape from the user. The direction of approach by the user is depicted in FIG. 12 by the arrow 62. It is substantially along this direction 62 that instruments will be inserted through the tissue simulation region 60 and apertures 58 in the top cover 48 to access the hernia model 10. In one variation, the simulated fascia layer 20 is connected to the trainer 46 with clips (not shown) that are connected to the trainer 46. The clips may be retractable and attached to the top cover 48, base 50, or legs 52. When clipped with the clips, the simulated fascia layer 20 is suspended within the cavity of the trainer 46 between the top cover 48 and the base 50 such as from the top cover 48. A gooseneck laparoscope holder 64 is provided on the trainer 46 to hold a scope (not shown). The scope is inserted into the trainer cavity via one of the apertures 58 or region 60 to capture video images of the obscured hernia model and display them to the user via the video monitor 54. Users practicing hernia repair will pass other instruments in addition to the scope into the cavity of the trainer to access the hernia model inside the trainer 46.

Figure 14:
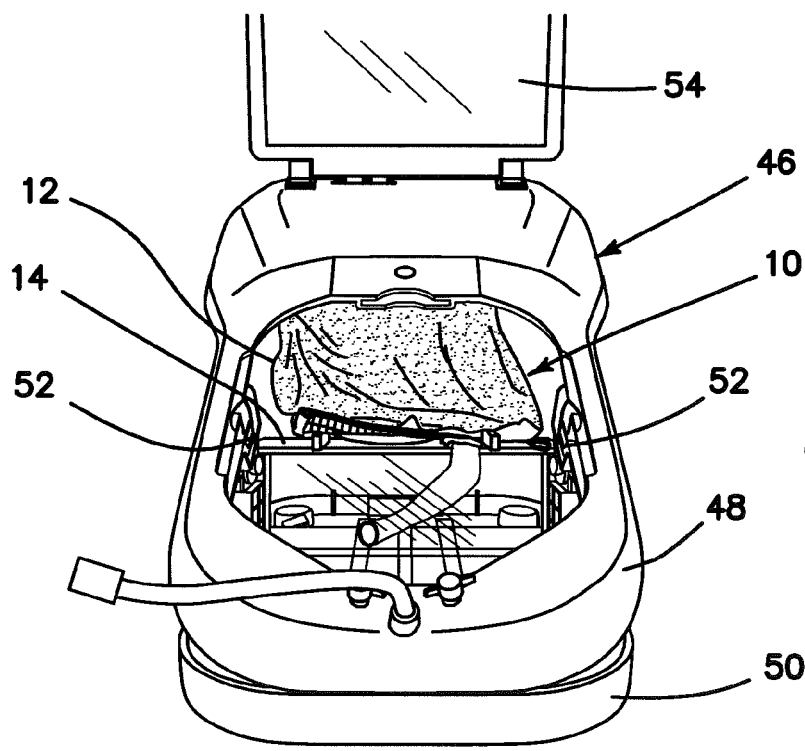
FIG. 14 is a front perspective view of a laparoscopic trainer with a hernia model according to the present invention.

FIG. 14 is a front view of the laparoscopic trainer 46 with the first insert 56 removed to provide a view of the hernia model 10 from the perspective of the user. The combination of the hernia model 10 and trainer 46 is particularly unique because it permits hernia repair training in a laparoscopic simulation. The hernia model 10 itself simulates an insufflation cavity formed between the muscular abdominal wall and the peritoneum via the C-shaped construct and without the need for any insufflation gas in the training simulation. This C-shaped construct is resiliently held in position by the reinforced metallic mesh layer 30 which provides support to the silicone tissue features attached thereto. The metallic mesh layer 30 and silicone layers 32, 34 further provide a springy feel that is realistic to an abdominal wall distended outwardly by insufflation gas. The selected colors and materials employed in the anatomical portion 12 including the yellow foam for the peritoneum and the pink silicone and translucent fascia layer and bowel mimic a real live surgical situation. Because the hernia model 10 includes an anatomical portion 12 that is angled 90 degrees, the resulting visual mimics the angles encountered in a real hernia repair situation. Furthermore, the angled top cover 48 of the trainer 46 allows the tall hernia model 10 to be received with ease. Also, the angled top cover 48 further mimics the outer anterior body of the patient with an insufflated abdominal region that is enlarged in the area of the hernia.

Figure 15:
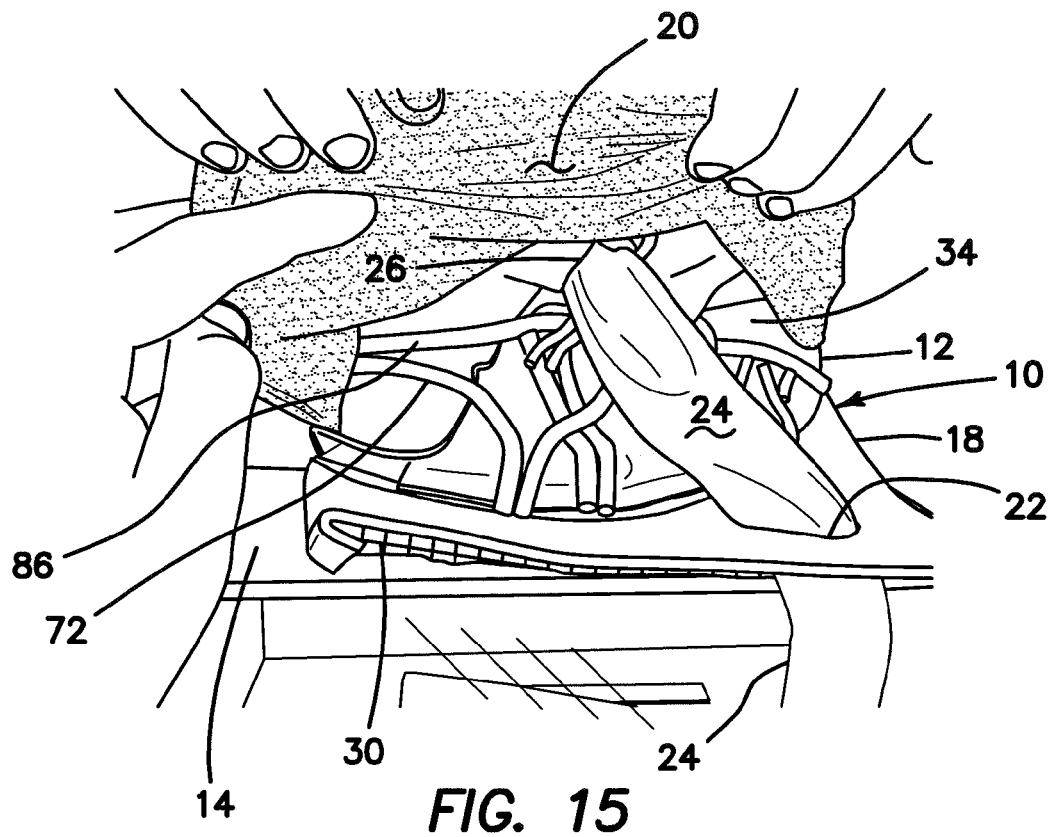
FIG. 15 is a front perspective view of a hernia model with human hands shown retracting simulated tissue according to the present invention.
Figure 16:
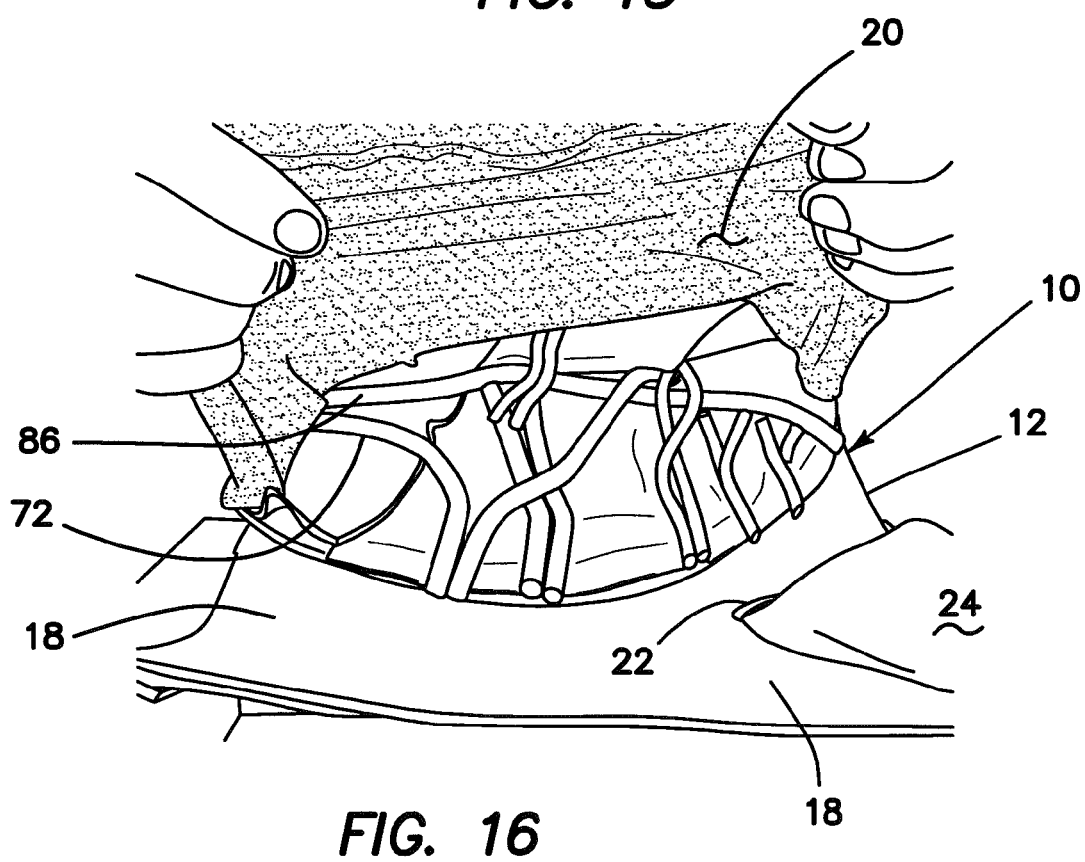
FIG. 16 is a front perspective view of a hernia model with human hands shown retracting simulated tissue according to the present invention.

The hernia model 10 combined with the angled trainer 46 provides a unique wedge-shaped approach to the target site of hernia repair via arrow 62 into a triangular or wedge-shaped cavity. This triangular shaped cavity is best seen in FIG. 12 wherein one side of the triangle, generally the hypotenuse of the triangle, is formed by the top cover 48. The base 50 of the trainer 46 forms the other side of the triangle that is substantially perpendicular to the hernia model 10 which forms the third side of the triangle. This triangle across the width of the trainer 46 defines a wedge-shaped cavity inside the trainer 46. With the angle of the top cover 48 being less than 45 degrees, an elongated wedge is created having a confined approach following arrow 62 or narrow cavity near the front of the trainer 46 that expands towards the rear of the trainer 46 where the hernia model 10 is located. This wedge-shaped cavity provides for an extremely realistic, confined and challenging surgical approach for the surgeon to practice both TEP and TAPP hernia repairs. FIG. 15 shows a view of the hernia model 10 as a surgeon practitioner would see in practice. The simulated fascia layer 20 is shown lifted by hand whereas, the surgeon practitioner would employ instruments to lift and dissect the simulated fascia layer 20. FIG. 15 illustrates a bowel portion 24 extending through the direct space 26. FIG. 16 illustrates a front view of the hernia model 10 with the simulated bowel portion 24 resected from the direct space 26 and still protruding through the opening 22 in the peritoneum 18.

Figure 17:
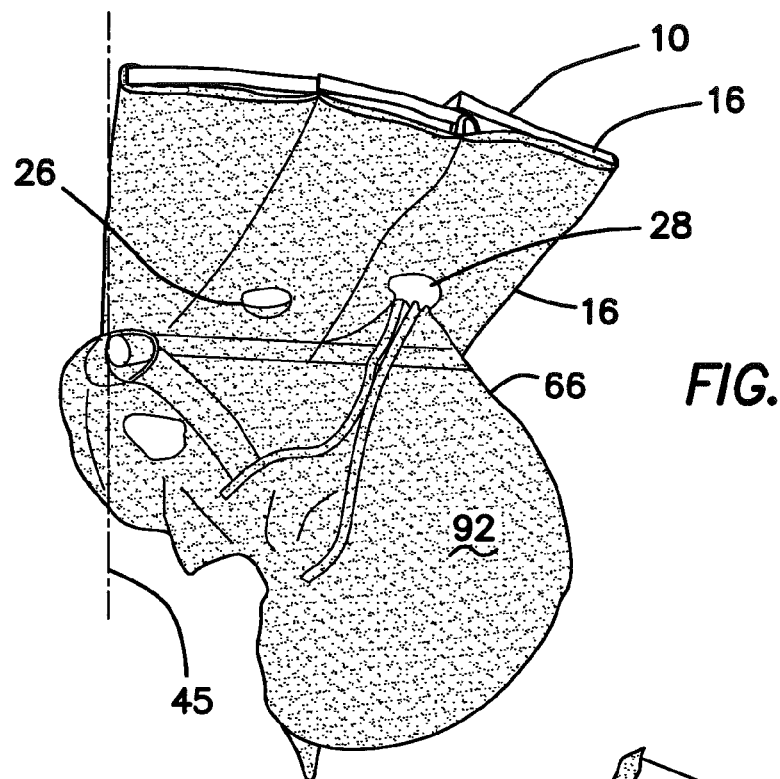
FIG. 17 is a front top perspective view of a hernia model according to the present invention.
Figure 18:
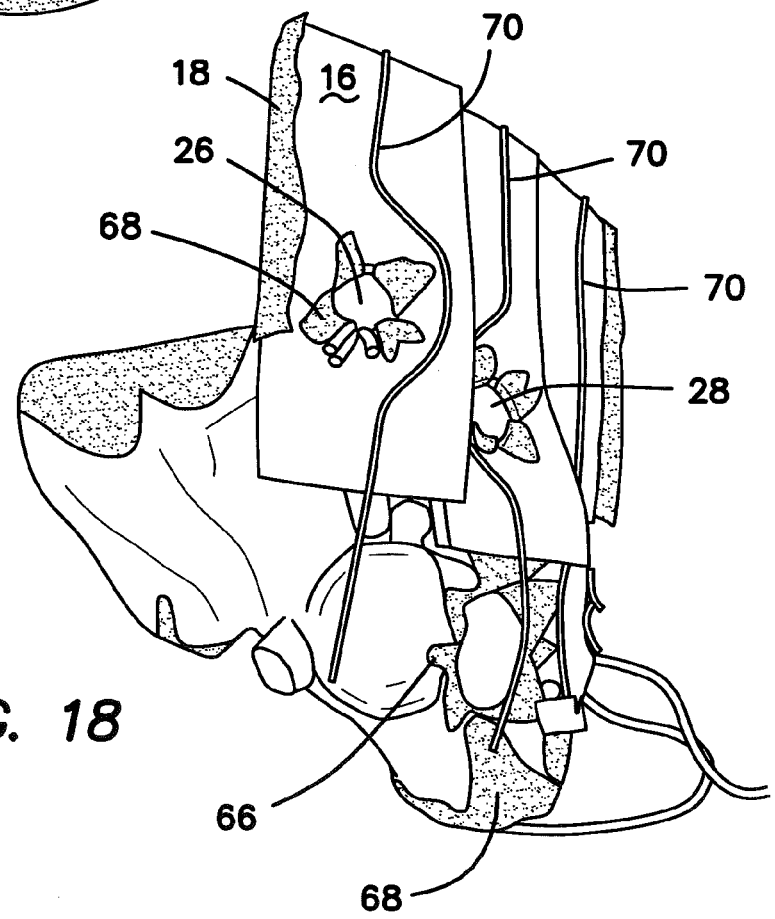
FIG. 18 is a rear top perspective view of a hernia model according to the present invention.

Turning now to FIGS. 17-21, there is shown another variation of the hernia model 10 where like reference numbers will be used to describe like parts. The hernia model 10 is substantially similar to the one described above and is configured for both practicing both the TEP and TAPP approaches. The model 10 of FIGS. 17-21 has an inner surface and an outer surface and is also substantially C-shaped in which the inner surface is concave. A simulated muscular abdominal wall 16 is connected to a simulated pelvis 66. The simulated muscular abdominal wall 16 forms approximately the top half or more of the model 10 or C-shaped curve. Instead of the bottom half or less than the bottom half of the C-shaped curve being formed by a simulated peritoneum as described above, it is formed by the simulated pelvis 66. The pelvic base 66 is molded and is shown in the figures to represent approximately half of a human pelvis approximately lateral to the midline 45 of the anatomy to illustrate a right-sided hernia model 10. The natural shape of the simulated pelvis 66 contributes to the curvature of the C-shape of the model 10. The pelvic base 66 is connected to the simulated muscular abdominal wall 16 which is made of foam material and reinforced and connected to the simulated pelvis 66 with wires 70 as can be seen in FIG. 18.

The simulated pelvis 66 is covered with a first silicone layer 68. The thin silicone layer 68 is not powdered and is cured after optionally being calendared over foam to impart the silicone layer 68 with at least one textured surface. The silicone layer 68 also covers the simulated muscular abdominal wall 16 at the inner surface. The silicone layer 68 is adhered to both the simulated pelvis 66 and to the simulated muscular abdominal wall 16 with adhesive. The silicone layer 68 is formed around, conformingly applied and adhered to the contours of both the simulated pelvis 66 and the simulated abdominal wall 16 including the first opening 26 which simulates the direct space and the second opening 28 which simulates the indirect space through which a hernia may extend. The model 10 may also be provided with a third opening that would simulate a femoral space through which the hernia may extend. The first silicone layer 68 includes two holes that are aligned with the first and second openings 26, 28. A third opening is included in the first silicone layer 68 if a third opening is formed in the simulated abdominal wall 16 to simulate a femoral space.

Figure 19:
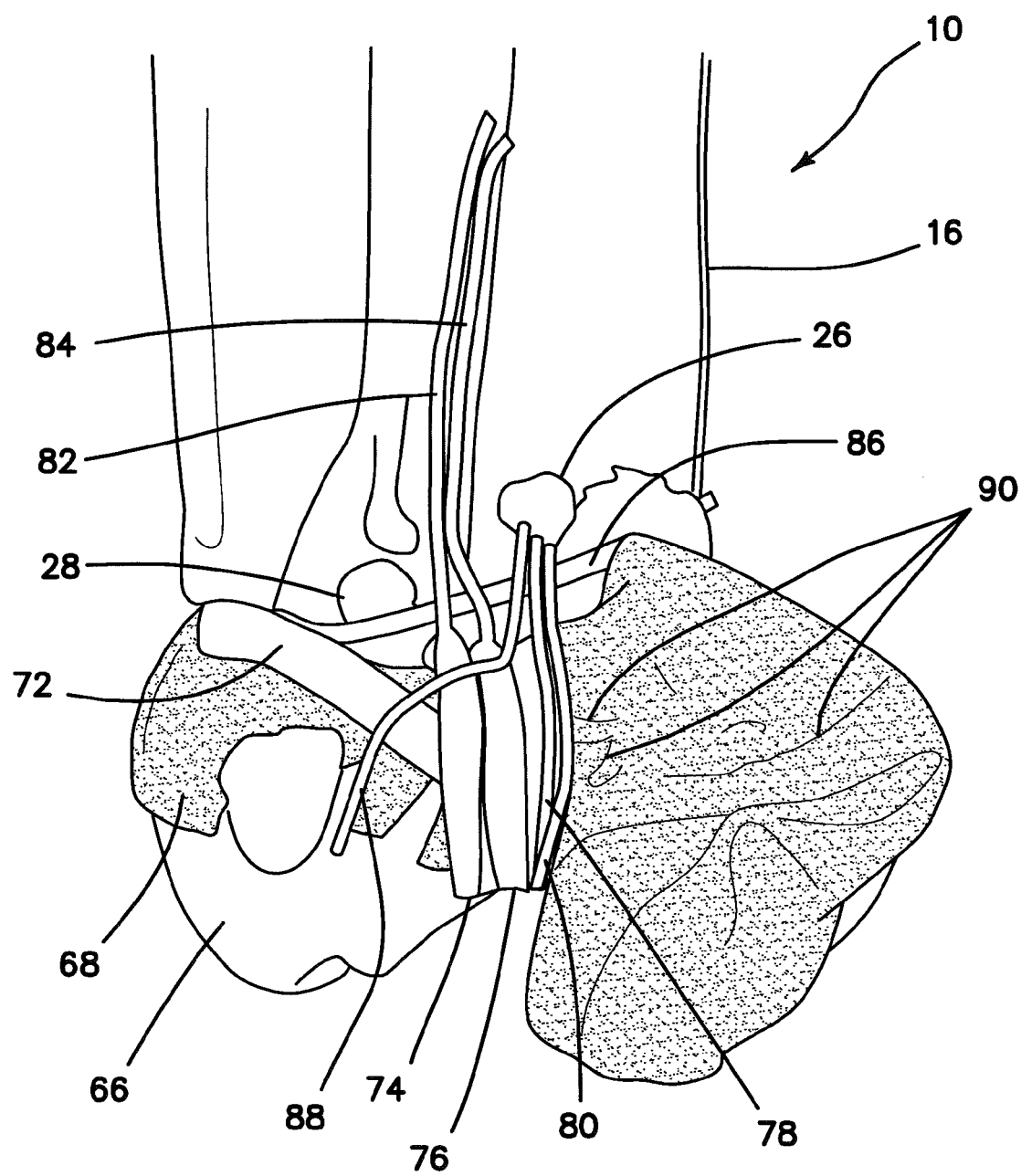
FIG. 19 is a top view of a hernia model according to the present invention.

With particular reference to FIG. 19, a variety of anatomical structures or body tissue components are overlaid onto the first silicone layer 68. Included among them is a simulated Cooper's ligament 72. The simulated Cooper's ligament 72 is made of a strip of silicone material that is white in color and overlaid onto the silicone layer 68. A white tube 86 representing the iliopubic tract is laid over the silicone layer 68. Then a simulated external iliac vein 74, simulated external iliac artery 76, simulated spermatic vein 78, simulated spermatic artery 80 are overlaid onto the silicone layer 68 and over the simulated iliopubic tract 86. A simulated epigastric vein 82 and simulated epigastric artery 84 extend upwardly from the simulated external iliac vein 74 and simulated external iliac artery 76, respectively, and are overlaid onto the silicone layer 68. The model 10 includes a simulated vas deferens 88 made of translucent silicone and additional nerves 90 also made of silicone that are placed over the silicone layer 68. The end of one or more of the simulated spermatic vein 78, spermatic artery 80 and vas deferens 88 are placed inside the first opening 26.

Figure 20:
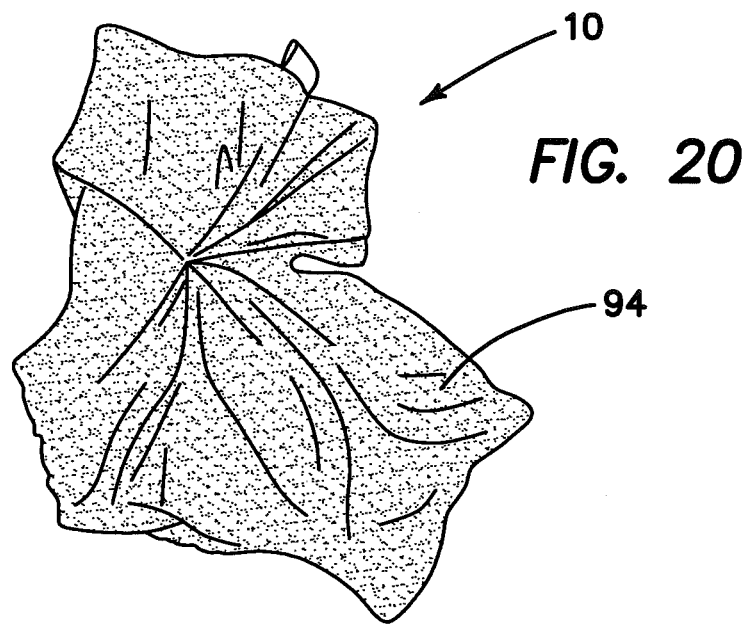
FIG. 20 is a top view of a hernia model according to the present invention.
Figure 21:
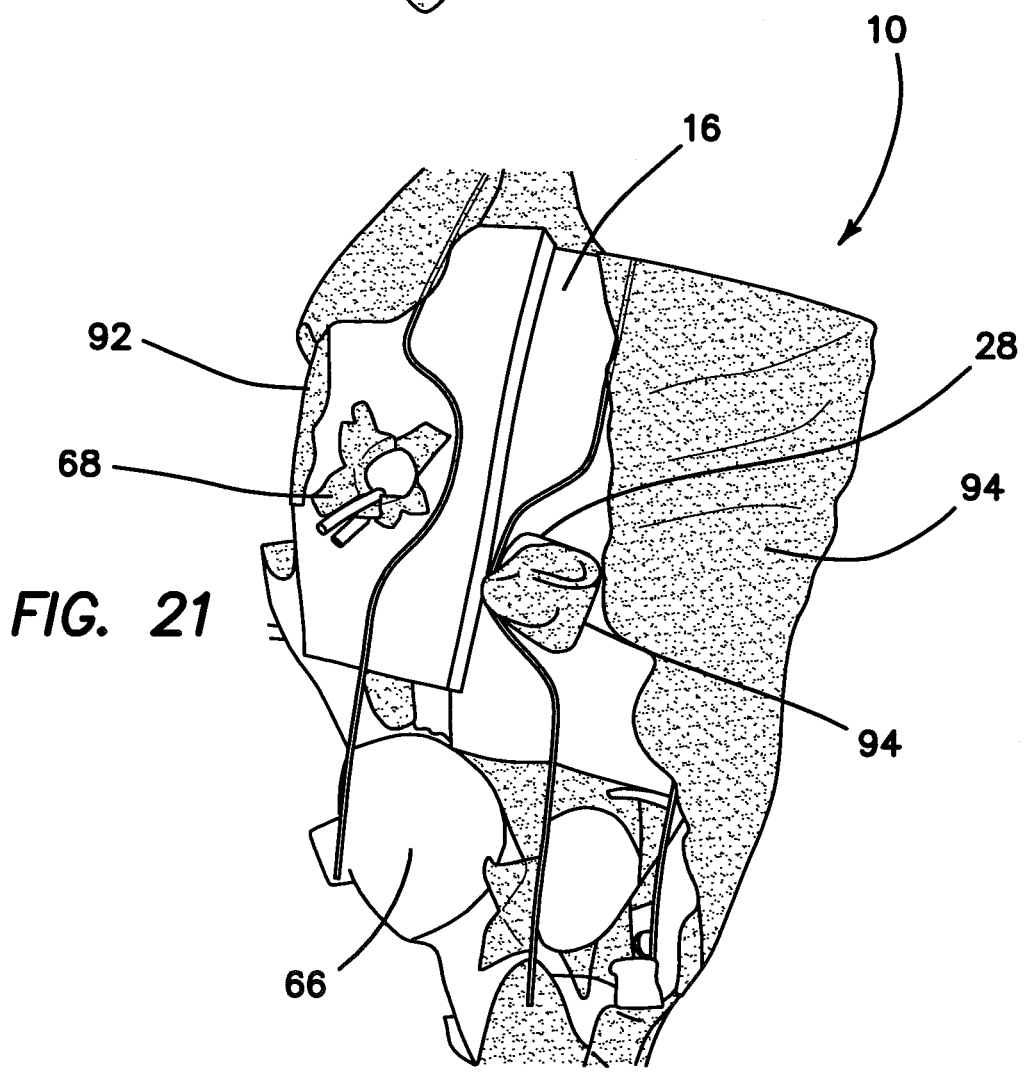
FIG. 21 is a rear top perspective view of a hernia model according to the present invention.

A second silicone layer 92 is placed over the anatomical structures to sandwich them between the first silicone layer 68 and the second silicone layer 92. The second silicone layer 92 includes two holes aligned with the two holes in the first silicone layer 68 and aligned with the first opening 26 and second opening 28. The second silicone layer 92 includes a third hole in a variation that includes a third opening aligned with a third opening in the first silicone layer 68 and third opening in the simulated abdominal wall 16 for the femoral space: The second silicone layer 92 is wrapped around the model 10 as shown in FIGS. 20 and 21 and attached with adhesive to the first silicone layer 68. The second silicone layer 92 may be selectively adhered along the edges such as to the back side of the model 10 and/or to the first silicone layer 92 between the anatomical landmarks and/or to the anatomical landmarks. In one variation, the second silicone layer 92 is attached to the spermatic vessels 78, 80 and to the vas deferens 88. The second silicone layer 92 is attached closely to the contours of the model 10 and the layer is formed through the first and second openings 26, 28 as shown in FIGS. 17-18. The second silicone layer 92 is translucent and thin and may include a textured outwardly-facing surface like the first silicone layer 68. The layer 92 is unpowdered, clear, white or pink in color.

The model 10 further includes a third layer 94 of silicone visible in FIGS. 20 and 21. The third layer 94 is configured to simulate the peritoneum. The third layer 94 is also unpowdered, thin and red in color and may include a textured outer-facing surface formed by calendaring the uncured silicone between one or more foam surfaces. The third layer 94 is pushed through one of the first or second opening 26, 28 or through the third opening that simulates the femoral space. In FIGS. 20-21, the third layer 94 is shown with a portion of the third layer 94 pushed through the second opening 28 to simulate the appearance of a hernia extending through the indirect space. The third layer 94 is attached with adhesive to the rest of the model 10. The third layer 94 is wrapped and glued around its edges to the backside of the model 10 as shown in FIG. 21. The third layer 94 may also be selectively adhered to portions of the underlying second silicone layer 92. The first silicone layer 68, second silicone layer 92 and third silicone layer 94 are all incisable with a blade and configured in thickness and tear strength to mimic real human tissue.

With the model 10 assembled as described, it is then inserted into the laparoscopic trainer 46 with the trainer 46 top cover 48 being angled or not angled with respect to its base 50 or with respect to a table top. The model 10 is inserted into the trainer 46 such that the concavity of the C-shape is positioned facing the first insert 56, apertures 58, and/or tissue simulation region 60 such that instruments inserted through these locations may readily observe or approach the concavity of the C-shape. The user will practice incising the second silicone layer 92 from the spermatic vessels, 78, 80 and vas deferens 88. With the model 10 inserted into the trainer 48, practitioners may practice resolving the hernia employing the TAPP or TEP procedures. For practicing TAPP procedures, the trainer 46 includes clips and the third layer 94 or simulated peritoneum is clipped to the surgical training device. The top cover of the surgical trainer may be angled to form an inner acute angle with respect to a horizontal plane in order to simulate a Trendelenburg positioning of the patient. The inner surface of the model faces the inner acute angle such that the inner surface of the model is approachable with instruments inserted into the internal cavity through the apertures 58 or penetrable simulated tissue region 60.

The hernia model 10 of the present invention is particularly suited for laparoscopic procedures; however, the invention is not so limited and the hernia model of the present invention can be used in open surgical procedures equally effectively.

It is understood that various modifications may be made to the embodiments of the hernia model disclosed herein. Therefore, the above description should not be construed as limiting, but merely as exemplifications of preferred embodiments. Those skilled in the art will envision other modifications within the scope and spirit of the present disclosure.

We claim:

1. An anatomical model for surgical training, comprising:
a simulated abdominal wall located at a first end and having an inner surface and an outer surface; the simulated abdominal wall having at least one opening extending between the inner surface and the outer surface;
at least a portion of a simulated pelvis at a second end having an inner surface and an outer surface; the simulated pelvis being connected to the simulated abdominal wall such that the inner surface of the simulated abdominal wall and the inner surface of the simulated pelvis define a common inner surface of the model;
a first layer of synthetic tissue having a bottom surface and a top surface; the first layer overlaying at least a portion of the simulated pelvis and at least a portion of the simulated abdominal wall; the first layer adhered to at least a portion of the simulated pelvis and to at least a portion of the simulated abdominal wall; the first layer including at least one opening aligned with the at least one opening in the simulated abdominal wall;
a second layer of synthetic tissue having a bottom surface and a top surface; the second layer overlaying at least a portion of the top surface of the first layer; the second layer including at least one opening aligned with the at least one opening in the simulated abdominal wall;
a plurality of simulated tissue components positioned between the first layer of synthetic tissue and the second layer of synthetic tissue; at least some of the plurality of simulated tissue components being adhered at least in part to at least one of the first layer of synthetic tissue and the second layer of synthetic tissue; and
a synthetic peritoneum overlaying the simulated abdominal wall and the simulated pelvis above the second layer of synthetic tissue;

wherein at least a portion of the synthetic peritoneum is removably located inside one opening in the simulated abdominal wall.

2. The anatomical model of claim 1 wherein the plurality of simulated tissue components includes a plurality of vessels.

3. The anatomical model of claim 1 wherein the plurality of simulated tissue components includes synthetic spermatic vessels and a synthetic vas deferens extending into the opening in the simulated abdominal wall.

4. The anatomical model of claim 3 wherein the second layer is adhered to at least one of the synthetic spermatic vessels and the synthetic vas deferens.

5. The anatomical model of claim 1 wherein the simulated abdominal wall includes two or three openings; and the synthetic peritoneum is selectively insertable into and removably located within any one of the openings in the abdominal wall to simulate a direct, indirect or femoral hernia.

6. The anatomical model of claim 1 wherein the synthetic peritoneum is located inside the opening in the simulated abdominal wall such that it extends through the opening from above the inner surface of the model to the outer surface of the model.

7. The anatomical model of claim 1 wherein the common inner surface of the model is concave.

8. A surgical simulation system for practicing hernia repair; comprising:
a hernia model including:
a simulated abdominal wall located at a first end of the model and having an inner surface and an outer surface; the simulated abdominal wall having at least one opening extending between the inner surface and the outer surface;
at least a portion of a simulated pelvis located at a second end of the model and having an inner surface and an outer surface; the simulated pelvis being connected to the simulated abdominal wall such that the inner surface of the simulated abdominal wall and the inner surface of the simulated pelvis define a common inner surface of the model;
a first layer of synthetic tissue having a bottom surface and a top surface; the first layer overlaying at least a portion of the simulated pelvis and at least a portion of the simulated abdominal wall; the first layer being adhered to at least a portion of the simulated pelvis and to at least a portion of the simulated abdominal wall; the first layer including at least one opening aligned with the at least one opening in the simulated abdominal wall;
a second layer of synthetic tissue having a bottom surface and a top surface; the second layer overlaying at least a portion of the top surface of the first layer; the second layer including at least one opening aligned with the at least one opening in the simulated abdominal wall and the at least one opening in the first layer;
a plurality of simulated tissue components positioned between the first layer of synthetic tissue and the second layer of synthetic tissue; at least some of the plurality of simulated tissue components being adhered at least in part to at least one of the first layer of synthetic tissue and the second layer of synthetic tissue; and
a synthetic peritoneum overlaying at least a portion of the simulated abdominal wall and at least a portion of the simulated pelvis and positioned above the second layer of synthetic tissue; and
a surgical training device, including:
a base;
a top cover connected to and spaced apart from the base to define an internal cavity being at least partially obstructed from direct observation by a user; the top cover including an aperture or penetrable simulated tissue region;
wherein the hernia model is positioned inside the internal cavity of the surgical training device.

9. The surgical simulation system of claim 8 wherein the surgical training device includes clips and the simulated peritoneum is clipped to the surgical training device.

10. The surgical simulation system of claim 8 wherein simulated peritoneum is connected to the surgical training device.

11. The surgical simulation system of claim 8 wherein the top cover of the surgical training device is angled to form an inner acute angle with respect to a horizontal plane.

12. The surgical simulation system of claim 11 wherein the common inner surface of the model faces the inner acute angle such that the common inner surface of the model is approachable with instruments inserted into the internal cavity through the aperture or penetrable simulated tissue region.

13. The surgical simulation system of claim 11 wherein at least a portion of the synthetic peritoneum is removably located inside one opening in the simulated abdominal wall.

* * * * *